United States Patent
Stautner et al.

(10) Patent No.: US 12,509,240 B2
(45) Date of Patent: Dec. 30, 2025

(54) MULTI-DIRECTIONAL BAFFLES FOR AIRCRAFT FUEL TANKS

(71) Applicant: General Electric Company, Schenectady, NY (US)

(72) Inventors: Ernst Wolfgang Stautner, Niskayuna, NY (US); Lokaditya Ryali, Albany, NY (US); Dhanushkodi Durai Mariappan, Guilderland, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/298,885

(22) Filed: Apr. 11, 2023

(65) Prior Publication Data
US 2024/0343407 A1 Oct. 17, 2024

(51) Int. Cl.
*B64D 37/08* (2006.01)
*F02M 21/02* (2006.01)

(52) U.S. Cl.
CPC ......... *B64D 37/08* (2013.01); *F02M 21/0221* (2013.01)

(58) Field of Classification Search
CPC ........ B64D 37/08; F02M 29/04; B65D 90/52; Y10T 137/86212
USPC ............................................ 220/560.04, 563
See application file for complete search history.

(56) References Cited

U.S. PATENT DOCUMENTS

| | | | |
|---|---|---|---|
| 2,678,660 A * | 5/1954 | Gurin | B64D 37/005 220/563 |
| 3,979,005 A | 9/1976 | Robinson et al. | |
| 4,840,025 A | 6/1989 | Coffinberry | |
| 4,844,278 A | 7/1989 | Freiwald et al. | |
| 4,927,045 A | 5/1990 | Lichka | |
| 5,890,618 A | 4/1999 | Spickelmire | |
| 5,960,981 A | 10/1999 | Dodson et al. | |
| 6,220,287 B1 * | 4/2001 | Wolf | B64G 1/402 137/574 |
| 6,848,472 B2 | 2/2005 | Bambacigno | |
| 8,881,855 B2 | 11/2014 | Cragel et al. | |
| 10,145,508 B2 | 12/2018 | Kim et al. | |
| 11,548,381 B2 | 1/2023 | Vaishnav et al. | |
| 2019/0077251 A1 * | 3/2019 | Kozar | B64D 37/32 |

FOREIGN PATENT DOCUMENTS

| | | |
|---|---|---|
| CN | 115158678 A | 10/2022 |
| EP | 2942285 A1 | 11/2015 |

OTHER PUBLICATIONS

European Patent Office, "Extended European Search Report," issued in connection with European Patent Application No. 24164682.7-1004, dated Aug. 23, 2024, 23 pages.

* cited by examiner

*Primary Examiner* — Jeffrey R Allen
(74) *Attorney, Agent, or Firm* — Hanley, Flight & Zimmerman, LLC

(57) ABSTRACT

Example systems and methods for using multi-directional baffles in cryogenic fuel tanks are provided. An example cryogenic fuel tank comprises an inner surface defining an interior of the cryogenic fuel tank to hold a fuel and a plurality of baffles including a first baffle, the first baffle including a first member extending along a first plane and a second member extending along a second plane, the first plane different from the second plane, the second member connected to the first member, the plurality of baffles connected to the inner surface.

20 Claims, 23 Drawing Sheets

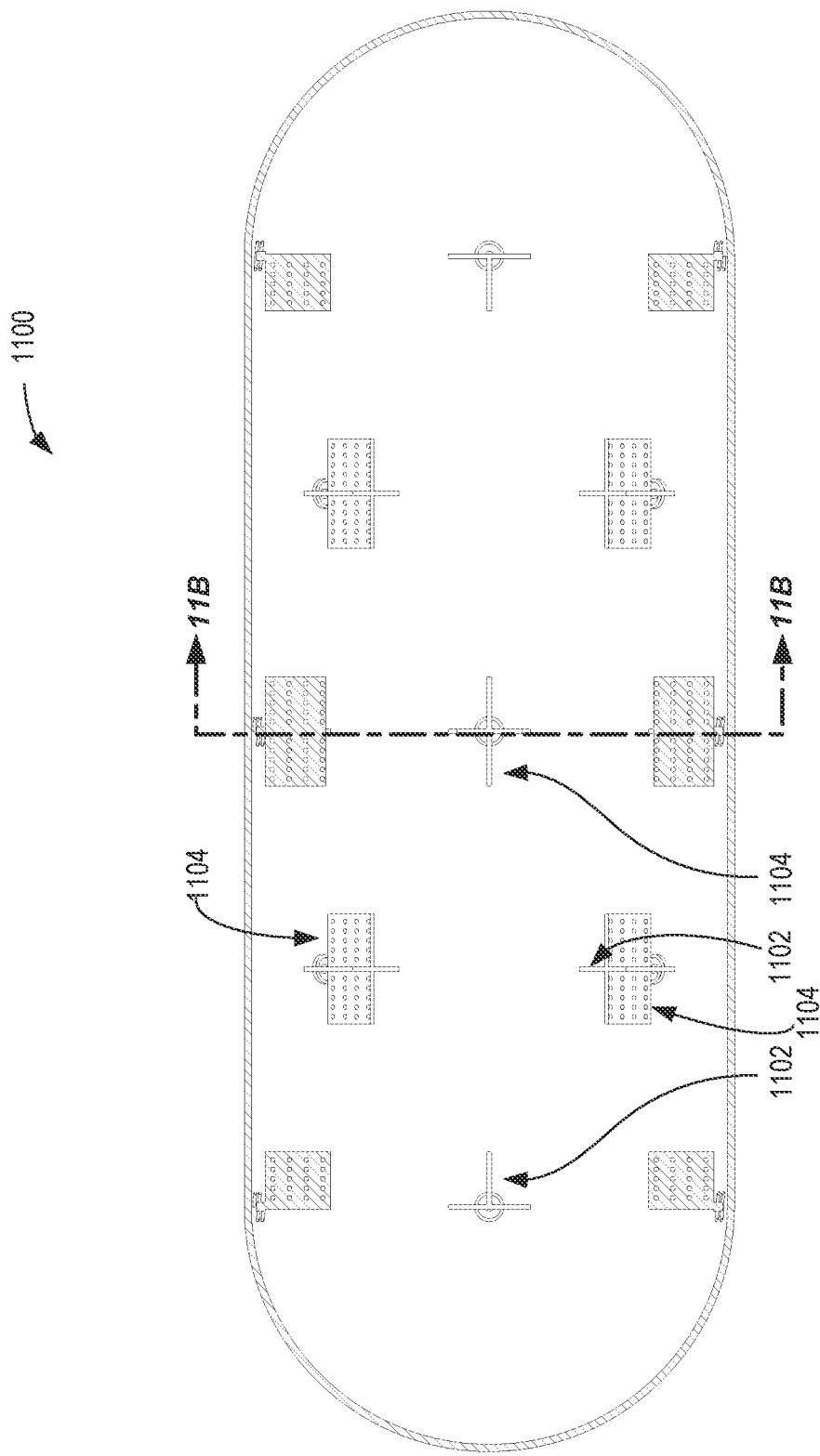

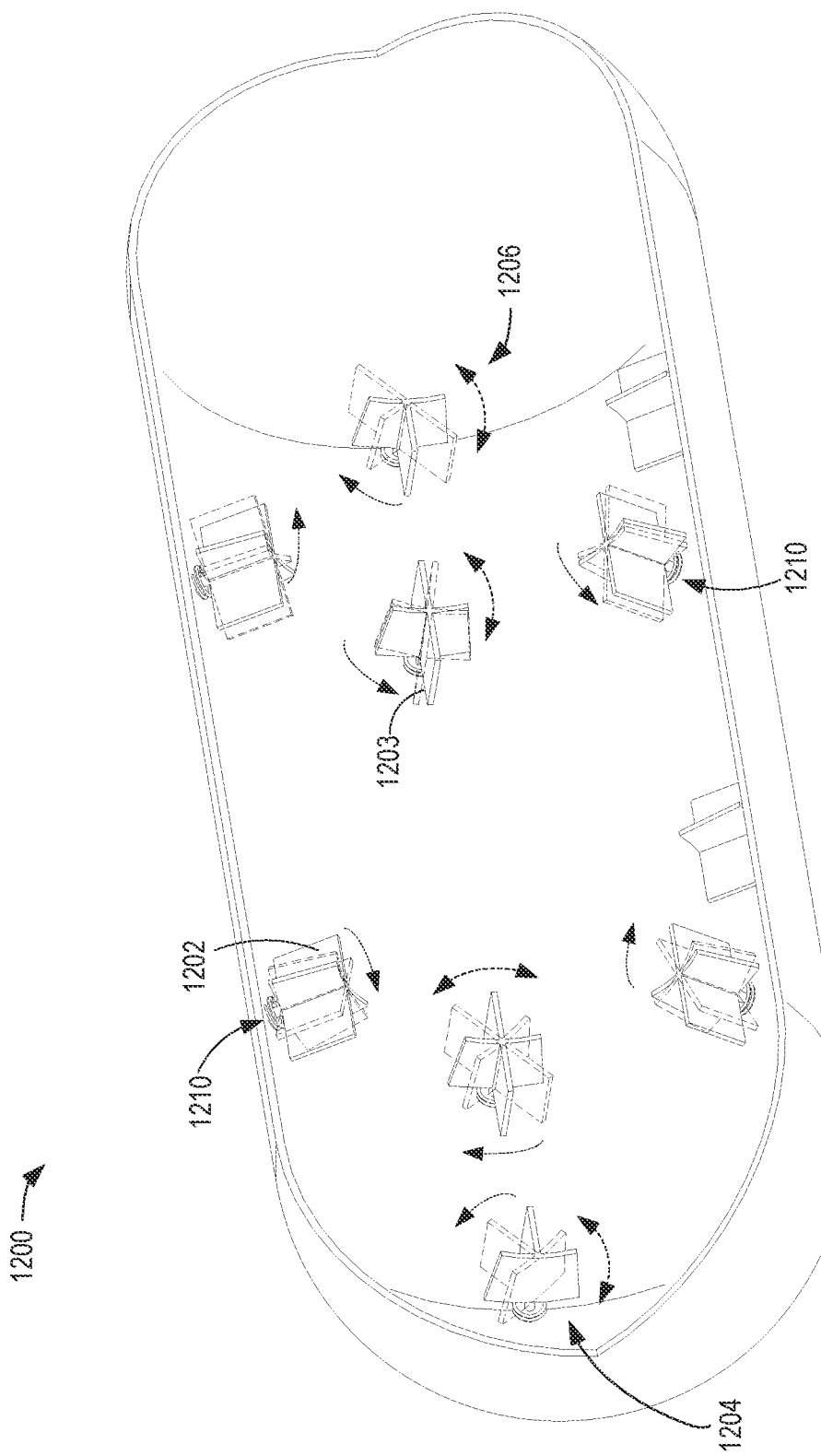

MULTI-DIRECTIONAL BAFFLES FOR AIRCRAFT FUEL TANKS

FEDERALLY SPONSORED RESEARCH

This invention was made with Government support under contract number 80NSSC19M0125 awarded by the National Aeronautics and Space Administration. The United States Government has certain rights in this invention.

FIELD OF THE DISCLOSURE

This disclosure relates generally to hydrogen aircraft fuel storage and, more particularly, to cryogenic hydrogen tank systems and methods for operating the same.

BACKGROUND

In recent years, hydrogen aircraft have been developed that include multiple onboard cryogenic tanks to store liquid hydrogen fuel. As opposed to other tank fuels, liquid hydrogen is susceptible to boil off and bubble formation in the fuel when exposed to fuel slosh, or movement of the fuel in the cryogenic fuel tank. In aircraft, exposure to acceleration is of particular concern, as g-loads can cause the fuel to move in all degrees of freedom.

BRIEF DESCRIPTION OF THE DRAWINGS

FIG. 11A is an illustration of a cross-sectional top view of a third arrangement of baffles with an angle of stagger.

FIG. 12A is an illustration of a cross-sectional top view of an example fuel tank with a plurality of baffles and the motion of the baffles when the baffles are attached to the fuel tank by a torsion spring.

Figure 1:
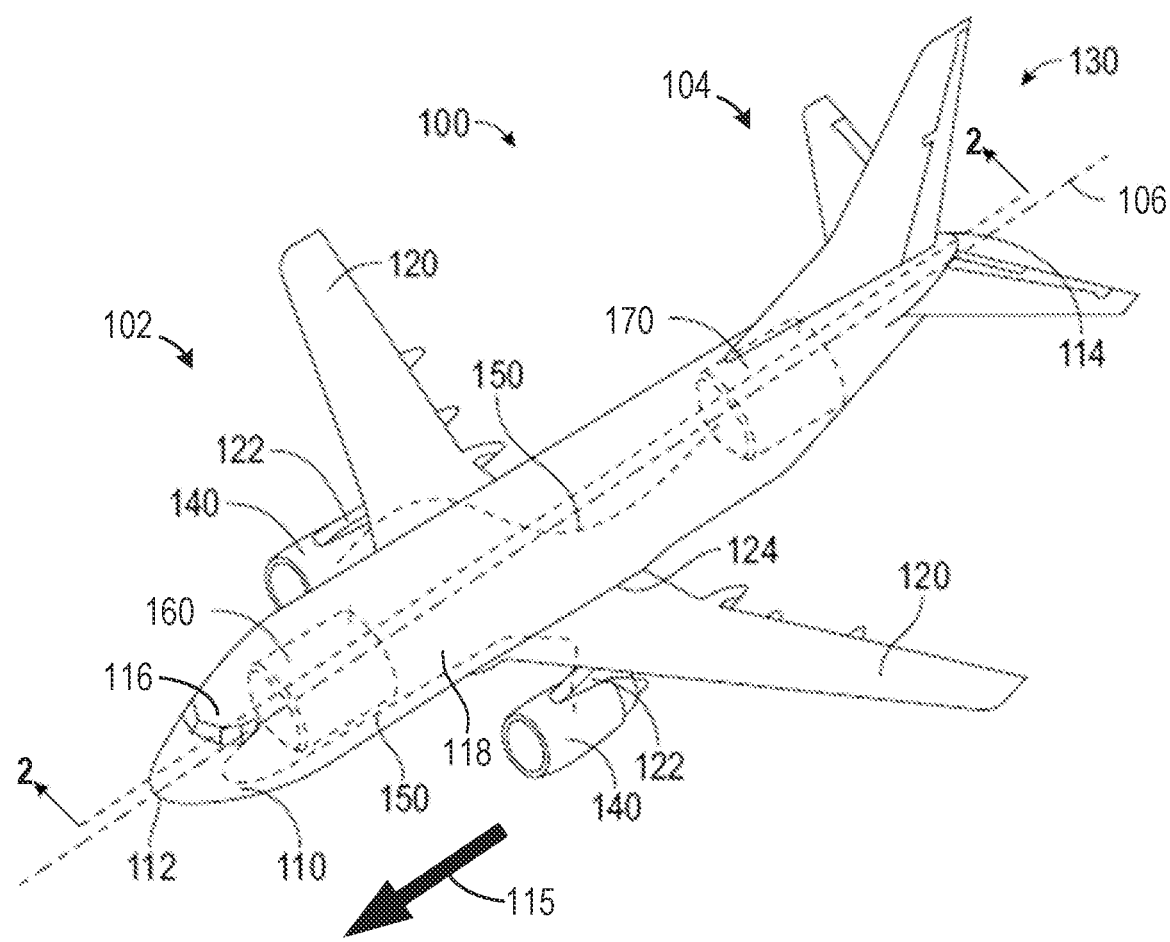
FIG. 1 is an illustration of an example first aircraft that can implement example integrated cryogenic hydrogen tank systems disclosed herein.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

In some examples herein, the term "substantially constant" is used to describe the state of a temperature, pressure, or some other property that is remaining within one unit of measure of the initial value (e.g. temperature is substantially constant in spite of a change from 11.1 degrees Celsius to 11.2 degrees Celsius).

In some examples used herein, the term "substantially similar" or "substantially equal" is used to describe a relationship between two entities that indicate that they are the same within one unit of measurement of each other (e.g. a vapor pressure 374.0 kPa is substantially equal to a saturated pressure of 374.2 kPa.

In some examples used herein, the term "substantially simultaneous" is used to describe a relationship between two components that are acting within one second of each other (e.g. at the same time).

As used herein, the term "substantially completely" is used to describe a liquid phase of the hydrogen fuel and refers to a unit mass (e.g., one kilogram (kg), one pound (lb.), etc.) of LH2 that includes near 100% hydrogen in the liquid phase, such as at least 99%, such as at least 97.5%, such as at least 95%, such as at least 92.5%, such as at least 90%, such as at least 85%, or such as at least 75% of LH2 per unit mass. For example, one unit mass of LH2 substantially completely in the liquid phase can include 95% liquid hydrogen and 5% hydrogen vapor bubbles.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

DETAILED DESCRIPTION

Examples and teachings disclosed herein are summarized for purposes of reading the description below. Example cryogenic hydrogen tank systems are disclosed herein. Example cryogenic hydrogen tanks are used to transport liquid hydrogen (LH2) and/or hydrogen vapor (gaseous hydrogen (GH2)). In some examples, hydrogen aircraft consume the LH2 for propulsion, requiring the storage of large amounts of LH2 or GH2. Due to having six degrees of freedom of aircraft acceleration, the liquid hydrogen is susceptible to fluid movement inside a cryogenic hydrogen tank (hereinafter referred to as "sloshing") which can result in fuel boil off, bubble formation, and/or dynamic imbalance forces/moments on the aircraft transporting the liquid hydrogen.

Hydrogen aircraft use hydrogen fuel (diatomic hydrogen) to eliminate carbon dioxide emissions relative to commercial aircraft that combust hydrocarbon fuels (e.g., Jet-A) for propulsion. However, hydrogen fuel poses a number of challenges as compared with combustible hydrocarbon liquid fuel. For example, in its gaseous form, hydrogen fuel has a much lower power density than Jet-A fuel. Even when hydrogen fuel is stored in the liquid phase, the volume of the liquid hydrogen (LH2) fuel is approximately four times the volume of Jet-A fuel to operate the aircraft over a given range. Moreover, hydrogen fuel has a relatively low boiling point and must be stored at cryogenic temperatures to be maintained in the liquid phase. A storage tank holding liquid hydrogen cryogenically requires more space overall and has an increased weight as compared with a storage tank holding a comparable volume of Jet-A fuel.

Ordinary or normal hydrogen gas that is liquefied includes about 25% Parahydrogen and 75% Orthohydrogen. The liquid undergoes a slow natural conversion from the ortho to the para form, liberating heat. This exothermic reaction generates heat greater than the heat of vaporization. This temperature increase can cause the LH2 to boil, hence the term "boil-off," which is used herein to describe the warming and evaporation process of contained LH2. Boil-off losses occur at the rate of about 1% per hour. A conversion catalyst minimizes or otherwise reduces these losses and yields better than 95% parahydrogen during liquefaction. It is assumed that liquid parahydrogen will be used as a fuel and can be stored with only nominal losses. In other words, despite an insulation quality of the onboard LH2 tank, the temperature of the LH2 can rise, and the LH2 can boil-off. Hydrogen vapor bubbles formed from boil-off can enter extraction flowlines with LH2 fuel and flow downstream to an LH2 pump.

When an example LH2 tank is refueled, the LH2 forms a first portion of the internal volume of the LH2 tank (e.g., 90%), and hydrogen vapor forms a second portion of the internal volume of the LH2 tank (e.g., 10%). As used herein, the "vapor pressure" refers to pressure acting on the interior walls of a tank (e.g., an onboard LH2 tank) and the surface of a liquid (e.g., LH2) within the tank. As used herein, "saturated pressure" refers to the vapor pressure when the LH2 and the hydrogen vapor are in equilibrium. That is, when the evaporation rate of the LH2 is equal to the condensation rate of the hydrogen vapor, the LH2 and the hydrogen vapor are in equilibrium and the vapor pressure is substantially similar to a saturated pressure at the given temperature. The saturated pressure is dependent on the temperature within the tank. Thus, when the temperature of the LH2 remains substantially constant, and when the LH2 settles after a given period (e.g., one hour, two hours, 12 hours, etc.), the LH2 and the hydrogen vapor are considered to be in equilibrium, and the vapor pressure is substantially similar to the saturated pressure.

The saturated pressure can be determined based on the temperature within the tank. Thus, when the example onboard LH2 tank is isolated and is left to settle (e.g., without refueling or extracting hydrogen) for a given time (e.g., two hours, three hours, 12 hours, etc.) without heat addition, the temperature can remain substantially similar over time, the evaporation and condensation rates can equalize, and the vapor pressure can become substantially similar (e.g., equal) to the saturated pressure.

Alternatively, when heat is added to the tank (e.g., via a thermosiphon loop, a heater, etc.), the evaporation rate of the LH2 increases and causes the vapor pressure to increase above the saturated pressure. In other words, when the temperature of the LH2 increases from a first temperature to a second temperature, the saturated pressure and the evaporation rate increase accordingly. However, the vapor pressure associated with the increased evaporation rate, for example eight to twelve bar of pressure, is greater than the saturated pressure associated with the second temperature. During operation, when the vapor pressure becomes substantially similar to the saturated pressure, there is not enough net positive pressure to drive the LH2 into extraction flowlines and cavitation can occur in the LH2. Thus, during operation, the vapor pressure is kept sufficiently higher, approximately two bar higher, than the saturated pressure. For example, the vapor pressure is maintained at levels that satisfy a safety threshold and an operational threshold of example tank systems disclosed herein. For example, 6 bar satisfies both thresholds of a tank system.

Another consideration of cryogenic hydrogen tanks is sloshing. A 100% full cryogenic hydrogen tank will not experience sloshing. However, when there is room for dynamic liquid movement of the liquid hydrogen, sloshing may occur. To understand the effects of sloshing, a g-load, or load factor based on a relationship to the force of gravity, is placed on the large sized liquid tank and must be analyzed. G-loads are caused by acceleration of an example aircraft. The g-loads cause significant fluid motion to be of concern due to the large sized tank structure.

Sloshing may have several effects on the tank due to liquid movement, as approximately one ton of liquid per tank is being sloshed or moved around. In some examples, sloshing imposes stress concentrations on a liquid hydrogen tank shell as well as on an outer vacuum chamber. In other examples, sloshing causes further liquid movement, which in turn mixes the liquid and vapor resulting in a temperature rise and corresponding tank pressure increase. This increase in tank temperature/pressure increases the amount of boil-off of liquid hydrogen and increases the amount of bubble formation. A greater amount of bubble formation increases the cavitation risk for the attached liquid hydrogen pump and puts further strain on a downstream phase separator when withdrawing liquid from the tank. In still other examples, sloshing creates an induced imbalance force or moment on the aircraft which may affect flight stability, lateral tanks, or other cryogenic hydrogen tanks. For these reasons, it is desired to minimize or otherwise reduce the amount of fuel slosh and hydrogen boil-off.

In order to combat sloshing, a baffle can be used. Baffles, or structures placed within a fuel tank to reduce the fuel slosh within the fuel tank, have various designs such as ring baffles, vertical slotted baffles, horizontal porous baffles, or grid-like baffles. The challenge associated with creation of a baffle is reducing the weight in an aircraft, while increasing an the size and compliance of the baffle in reducing fuel slosh. Baffles can also be used to harness or control the reduced sloshing that can still occur in the fuel tank. Controlled sloshing provides a mixing effect that helps to reduce hydrogen stratification. Hydrogen stratification can be a concern for temperature and pressure build up, whereas sloshing tends to reduce the pressure in the tank due to the mixing of liquid and vapors.

The refueling of an example LH2 tank presents another challenge. Current baffle designs, such as ring baffles, limit the methods to fill a fuel tank. Not only do these existing baffle designs take up more space and subsequently weigh more, but the existing baffle designs compartmentalize the example fuel tank. To completely fill a tank, pumps are required to be used to circulate the fuel and flow the fuel from compartment to compartment to ensure the LH2 tank is completely filled. This has an associated added cost, equipment, and effort, as well as added weight from the existing baffle design.

FIG. 1 is an illustration of an example first perspective view of an example first aircraft 100 that can include example cryogenic hydrogen tank systems disclosed herein. The first aircraft 100 includes a forward portion 102 and an aft portion 104 axially aligned along a centerline 106. The first aircraft 100 includes a fuselage 110, wings 120 attached to the fuselage 110, and an empennage 130. In the example of FIG. 1, the first aircraft 100 includes a pair of wings 120, one on a port side of the first aircraft 100 (a port wing) and one on a starboard side of the first aircraft 100 (a starboard wing).

Although the first aircraft 100 illustrated in FIG. 1 is a commercial airplane, examples described herein can also be applicable to other types of fixed-wing aircraft, such as cargo aircraft, unmanned aerial vehicles (UAV), etc.

The fuselage 110 includes a nose 112 and a tail 114, and the centerline extends axially between the nose 112 and the tail 114. In the example of FIG. 1, the first aircraft 100 is substantially symmetric about the centerline 106. The first aircraft 100 can generate lift to perform flight operations when the aircraft 100 propels itself in a forward direction 115, wherein the forward direction 115 is generally aligned with the centerline 106 and points from the aft portion 104 toward the forward portion 102 of the aircraft 100.

The first aircraft 100 illustrated in FIG. 1 is a commercial passenger aircraft including a cockpit 116 to allow operation of the first aircraft 100. The first aircraft 100 also includes a passenger compartment 118 to accommodate passenger seating. In the illustrated example, a first cryogenic hydrogen tank 160 ("first tank 160") is placed aft of the cockpit 116 to separate the cockpit 116 from the passenger compartment 118, and a second cryogenic hydrogen tank 170 ("second tank 170") is placed aft of the passenger compartment 118 to separate the passenger compartment 118 from the empennage 130 and the tail 114. In some examples, the first aircraft 100 is a cargo aircraft including storage bays to replace and/or accompany the passenger compartment 118.

The first aircraft 100 also includes a propulsion system that produces a propulsive thrust required to propel the first aircraft 100 in flight, during taxiing operations, and the like. The propulsion system for the first aircraft 100 shown in FIG. 1 includes engines 140. In the example of FIG. 1, the engines 140 are attached to the wings 120 by pylons 122 in an under-wing configuration. Although the engines 140 are shown attached to the wings 120 in an under-wing configuration in FIG. 1, in some other examples, the engines 140 can have alternative configurations and/or can be coupled to other portions of the first aircraft 100. For example, the engines 140 can additionally or alternatively include one or more engines (e.g., engines 140) coupled to other parts of the first aircraft 100, such as, for example, the empennage 130 and the fuselage 110.

The wings 120 are attached to the fuselage 110 at example attachment points 124. As the first aircraft 100 is propelled through the air, the wings 120 generate lift and the resultant lift acts on the first aircraft 100 at a wing center of lift (described below), sometimes also referred to as a center of pressure.

The engines 140 shown in FIG. 1 are hydrogen turbine engines that are each capable of selectively generating a propulsive thrust for the first aircraft 100. The amount of propulsive thrust can be controlled at least in part based on a volume of fuel provided to the hydrogen turbine engines 140 via a fuel system. In some examples, the LH2 fuel is stored in the first cryogenic hydrogen tank 160 and the second cryogenic hydrogen tank 170. Example tank systems disclosed herein include a fuel delivery assembly 150 providing the fuel flow from the first tank 160 and/or the second tank 170 to the engines 140, and, more specifically, to a fuel manifold of the combustion section of the turbomachine of the hydrogen turbine engines 140. The fuel delivery assembly 150 includes tubes, pipes, and the like, to fluidly connect the various components of example integrated tank systems to the hydrogen turbine engine 140. The fuel delivery assembly 150 can also include various other components and systems used to distribute LH2 fuel in example tank systems to the gas turbine engines 140, such as pumps, vaporizers, and the like.

Example cryogenic hydrogen tank systems disclosed herein are described as including first tank 160, second tank 170, and/or other cryogenic hydrogen tanks to provide LH2 fuel to be combusted in the hydrogen turbine engines 140. However, in some examples, cryogenic hydrogen tank systems disclosed herein can be used to supply LH2 and/or GH2 to other power systems, such as hydrogen fuel cells, power generators, and/or other electrical generators that rely on hydrogen fuel to function.

Example cryogenic hydrogen tank systems disclosed herein are configured to hold the hydrogen fuel at least partially within the liquid phase and are configured to provide hydrogen fuel to the fuel delivery assembly 150 substantially completely in the liquid phase. However, due to refueling processes, in-flight sloshing, boil-off, etc., the LH2 can include vapor bubbles which can flow into LH2 extraction flowlines. Such vapor bubbles can cause cavitation damage to LH2 pumps driving flow from example integrated tank systems. Thus, example baffle systems are included in example cryogenic hydrogen tanks disclosed herein. Such baffle systems are described in greater detail below.

To store the hydrogen fuel substantially completely in the liquid phase, the hydrogen fuel is stored in cryogenic fuel tanks at cryogenic temperatures. For example, the first and second tanks 160, 170 can store hydrogen fuel at a temperature of −253 degrees Celsius (° C.) (20 Kelvin (K)) and a saturated pressure of 15 pounds per square inch (psi) to maintain the hydrogen fuel substantially completely in the liquid phase. As noted above, storing hydrogen fuel in the liquid phase within a volume sufficient to power the first aircraft 100 over a range of a typical continental flight, international flight, overseas flight, etc., can involve larger cryogenic hydrogen tank(s) (e.g., first tank 160, second tank 170, etc.).

Figure 2:
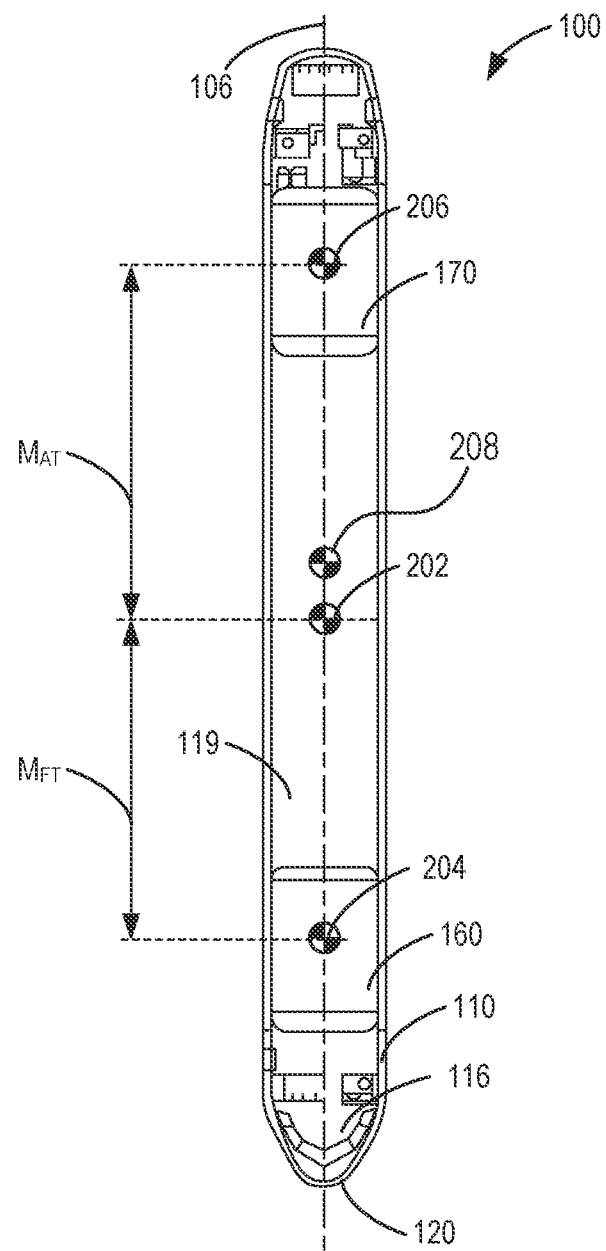
FIG. 2 is an illustration of a cross-sectional view of the example first aircraft.

FIG. 2 is a schematic illustration of a cross section of the fuselage 110 taken along line 2-2 in FIG. 1. As mentioned above, the wings 120 are configured to generate a center of lift 202. In this example, the first and second cryogenic hydrogen tanks 160, 170 are located entirely within the fuselage 110. The first and second tanks 160, 170 are located within the fuselage 110 such that the first and second tanks 160, 170 are substantially equidistant from the wing center of lift 202. As noted above, the first aircraft 100 is symmetrical about the centerline 106, and the wing center of lift 202 is located on the centerline 106. Locating the first and second tanks 160, 170 substantially equidistant in the forward and aft directions from the wing center of lift 202 promotes the balance and stability of the aircraft 100 during flight.

More specifically, the first tank 160 defines a first center of gravity 204 and defines a moment arm $M_{FT}$ extending between the wing center of lift 202 and the first center of gravity 204. Likewise, the second tank 170 defines a second center of gravity 206 and defines a moment arm $M_{AT}$ extending between the wing center of lift 202 and the second center of gravity 206. As shown in FIG. 2, the first and second tanks 160, 170 define a third center of gravity 208. In some examples, a position of the third center of gravity 208 is based on a combination of the first center of gravity 204 and the second center of gravity 206. In the illustrated example, the third center of gravity 208 is positioned aft of the wing center of lift 202. However, in some examples, the third center of gravity 208 is aligned with the wing center of lift 202.

The first tank 160 and the second tank 170 are positioned within the fuselage 110 such that the moment arms $M_{FT}$, $M_{AT}$ are balanced when fuel levels therein are substantially similar (e.g. when both fuel tanks are half filled). When the first and second tanks 160, 170 are separated in example tank systems, the fuel delivery assemblies 150 are to extract LH2 from the first and second tanks 160, 170 substantially simultaneously so as not to significantly unbalance the aircraft 100. Such synchronization can lead to complex control systems of the fuel delivery assemblies 150. Furthermore, when separated, the first and second tanks 160, 170 cannot trim and/or redistribute fuel if fuel extraction becomes unsynchronized. Thus, the first and second tanks 160, 170 can be included in example tank systems disclosed herein to refuel and/or extract LH2 to/from the first and second tanks 160, 170 substantially simultaneously (e.g. at the same time) without complex and/or multiple control systems for the fuel delivery assemblies 150.

Figure 3A:
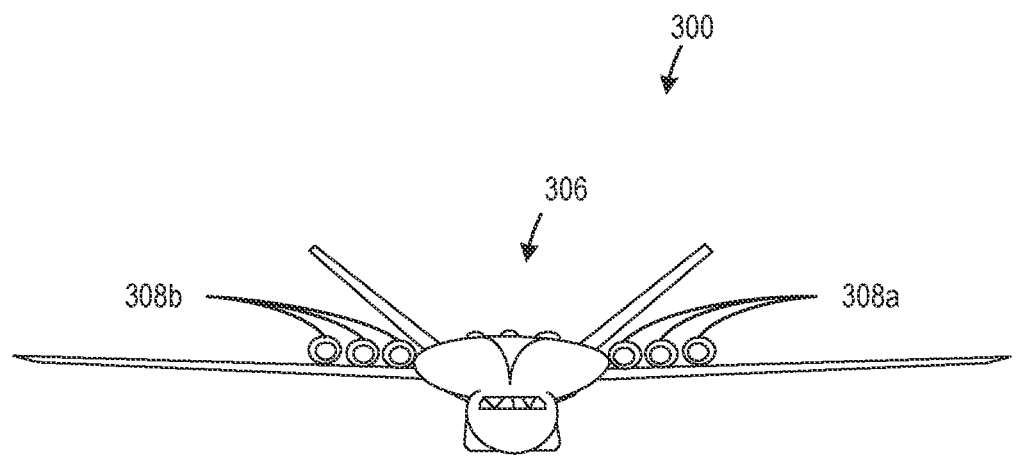
FIG. 3A is an illustration of a front view of an example second aircraft that can implement the example cryogenic hydrogen tank systems disclosed herein.

FIG. 3A is an illustration of a front view of an example second aircraft 300 that can include example cryogenic hydrogen tanks disclosed herein. In this example, front view 306 shows the second aircraft 300 includes a first group of engines 308a and a second group of engines 308b. In some examples, the second aircraft 300 includes a fuel delivery system to provide LH2 fuel from example tank systems to the first and second groups of engines 308a, 308b. The first and second groups of engines 308a, 308b can combust the fuel to generate a propulsive thrust and propel the second aircraft 300 in flight, during taxiing operations, and the like. In the example of FIG. 3A, each engine of the first and second groups of engines 308a, 308b is attached to an upper portion of the pair of wings 320 (shown in FIG. 3C) via a pylon or some other connective structure not shown in FIGS. 3A-3C. Although the first and second groups of engines 308a, 308b are attached to the upper portion of the pair of wings 320 (shown in FIG. 3C) in FIG. 3A, in other examples, one or more of the engines of the first and/or second groups of engines 308a, 308b can have alternative configurations and/or can be coupled to other portions of the second aircraft 300.

Similar to the example first aircraft 100 of FIG. 1, the first and second groups of engines 308a, 308b illustrated in FIG. 3A are hydrogen turbine engines that are each able to selectively generate a propulsive thrust for the second aircraft 300. The amount of propulsive thrust can be controlled at least in part based on a volume of liquid hydrogen (LH2) fuel provided to the first and second groups of engines 308a, 308b via an example fuel delivery system. Although the fuel delivery system is not illustrated in FIGS. 3A-3C, the fuel delivery system included in the second aircraft 300 can include elements (e.g., the fuel delivery assembly 150) that are substantially similar to those illustrated in FIGS. 1 and/or 2.

Figure 3B:
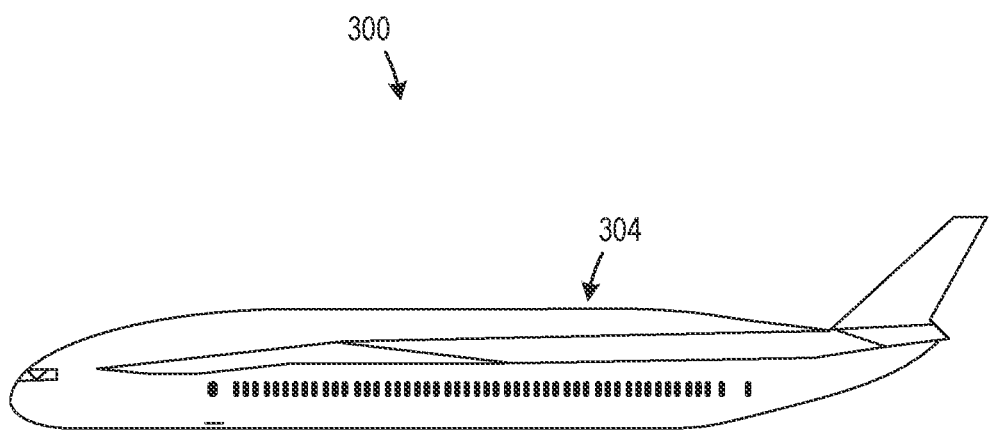
FIG. 3B is an illustration of a side view of the example second aircraft that can implement the example cryogenic hydrogen tank systems disclosed herein.

FIG. 3B is an illustration of the same example second aircraft 300 from a side view. In this example, side view 304 shows the aircraft that can include example cryogenic hydrogen tanks disclosed herein. Although the second aircraft 300 shown in FIG. 3B is a commercial passenger aircraft, examples described herein can also be applicable to other fixed-wing aircraft, including cargo aircraft, unmanned aerial vehicles (UAV), hypersonic launch vehicles, etc.

Figure 3C:
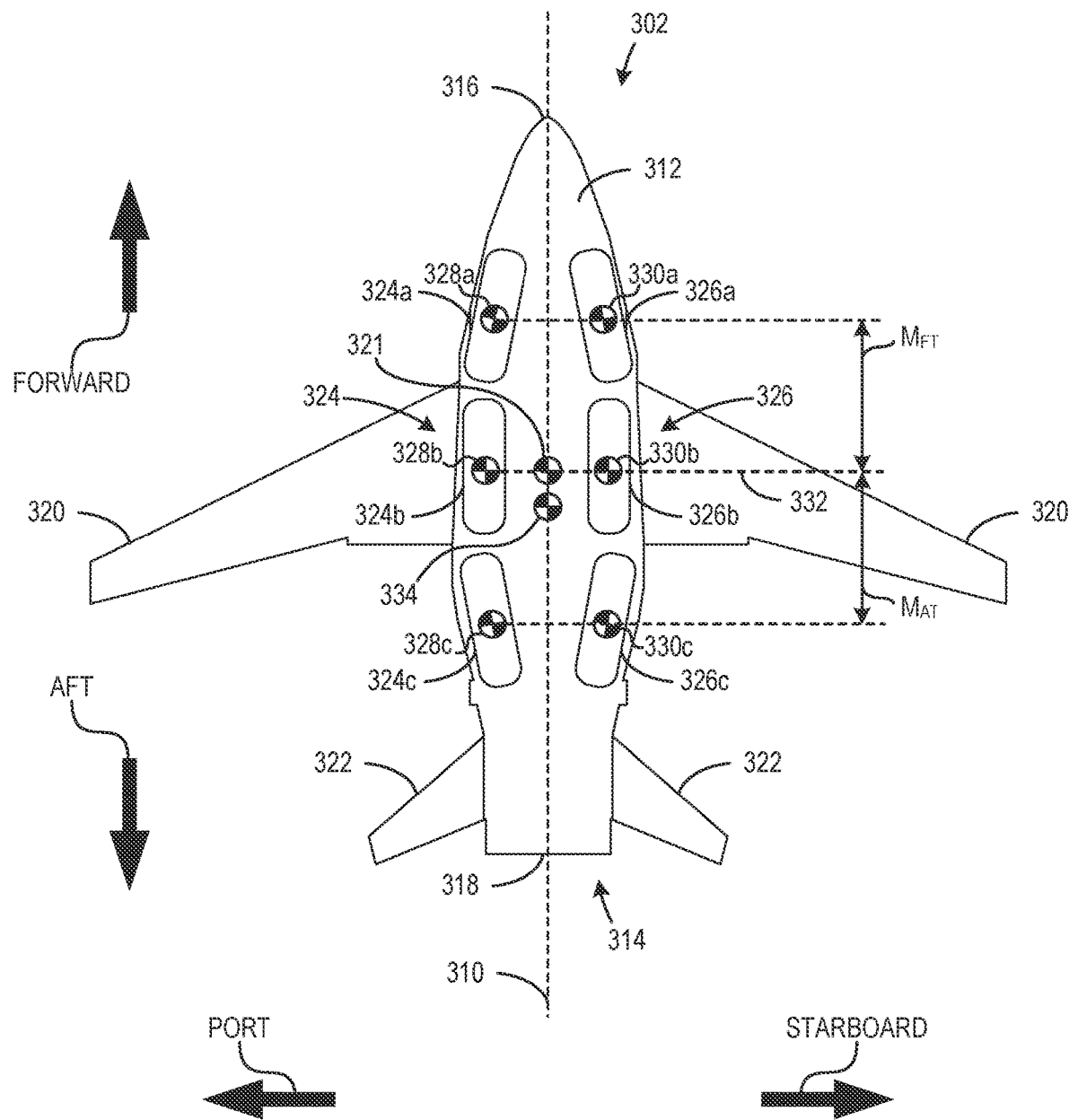
FIG. 3C is an illustration of a top view of the example second aircraft that can implement the example cryogenic hydrogen tank systems disclosed herein.

FIG. 3C is an illustration of a top view of the example second aircraft 300 that can include example cryogenic hydrogen tanks disclosed herein. The example top-down view 302 is intended to show placements and/or locations of various elements of the second aircraft 300 relative to such a view but not intended to illustrate a cross-sectional view of the second aircraft 300. The second aircraft 300 illustrated in FIG. 3C is substantially symmetric about a centerline 310 and includes a fuselage 312 and an empennage 314. The example centerline 310 extends from a nose 316 to a tail 318 of the second aircraft 300.

Similar to the example first aircraft 100 (FIGS. 1 and 2), the second aircraft 300 includes wings 320 attached to the fuselage 312, wherein one wing is positioned on a port side of the second aircraft 300 (a port wing), and another wing is positioned on a starboard side of the second aircraft 300 (a starboard wing). As the second aircraft 300 is propelled through the air, the wings 320 generate lift and the resultant lift acts on the second aircraft 300 at a wing center of lift 321, sometimes also referred to as a center of pressure. The example second aircraft 300 also includes stabilizers 322 attached to the empennage 314, wherein one stabilizer is positioned on the port side of the second aircraft 300 (a port stabilizer), and another stabilizer is positioned on the starboard side of the second aircraft 300 (a starboard stabilizer). As illustrated in FIG. 3, a forward direction (toward the nose 316), an aft direction (toward the tail 318), a port direction (toward the left side of FIG. 3), and a starboard direction (toward the right side of FIG. 3) are associated with the second aircraft 300.

Example cryogenic hydrogen tank systems disclosed herein can store LH2 fuel in a first group of cryogenic hydrogen tanks 324 ("first group of tanks 324") and a second group of cryogenic hydrogen tanks 326 ("second group of tanks 326"). The first group of tanks 324 includes a first tank 324a, a second tank 324b, and a third tank 324c. The second group of tanks 326 includes a fourth tank 326a, a fifth tank 326b, and a sixth tank 326c. In some examples, the tanks 324a-324c, 326a-326c are substantially similar to the first and second tanks 160, 170 described in connection with FIGS. 1 and 2.

In the illustrated example of FIG. 3C, the first and second groups of tanks 324, 326 are located entirely within the fuselage 312. The first and fourth tanks 324a, 326a are positioned forward of the second and fifth tanks 324b, 326b. The third and sixth tanks 324c, 326c are positioned aft of the second and fifth tanks 324b, 326b. As illustrated in FIG. 3C, each of the first tank 324a defines a first center of gravity 328a, the second tank 324b defines a second center of gravity 328b, the third tank 324c defines a third center of gravity 328c, the fourth tank 326a defines a fourth center of gravity 330a, the fifth tank 326b defines a fifth center of gravity 330b, and the sixth tank 326c defines a sixth center of gravity 330c. In some examples, the second center of gravity 328b, the fifth center of gravity 330b, and the wing center of lift 321 are substantially aligned along a reference line 332 oriented transverse (or substantially perpendicular) to the centerline 310.

In some examples, the first and second groups of tanks 324, 326 are located in the fuselage 312 such that, relative to the forward and aft directions, the first, third, fourth, and sixth centers of gravity 328a, 328c, 330a, 330c are substantially equidistant from the wing center of lift 321. Similarly, relative to the port and starboard directions, the first, third, fourth, and sixth centers of gravity 328a, 328c, 330a, 330c are substantially equidistant from the centerline 310.

An example forward tank moment arm, $M_{FT}$, extends from the wing center of lift 321 to the centers of gravity of the two forward tanks, and an example aft tank moment arm, $M_{AT}$, extends from the wing center of lift 321 to the centers of gravity of the two aft tanks. When the first and second groups of tanks 324, 326 are of substantially similar sizes/geometries, are filled/trimmed to substantially similar LH2 capacities, and are included in example integrated tank systems, the moments generated by the front and aft centers of gravity, the $M_{FT}$, and the $M_{AT}$ are substantially equal.

As shown in FIG. 3, the first and second groups of tanks 324, 326 define a seventh center of gravity 334. In some examples, a position of the seventh center of gravity 334 is based on a combination of the first, second, third, fourth, fifth, and sixth centers of gravity 228a-228c, 230a-230c. In the illustrated example, the seventh center of gravity 334 is positioned aft of the wing center of lift 321. However, in some examples, the seventh center of gravity 334 is aligned with the wing center of lift 321.

The second aircraft 300 illustrated in FIGS. 3A-3C is a commercial passenger aircraft similar to the first aircraft shown in FIG. 1. However, since the first and second groups of tanks 324, 326 include six tanks, the second aircraft 300 has a longer range than the first aircraft 100 (FIGS. 1 and 2). As mentioned previously, to increase the LH2 fuel capacity and range of hydrogen aircraft, more cryogenic tanks are included rather than developing one larger onboard tank. Having multiple cryogenic tanks distributes fuel weight more evenly throughout the fuselage 312 than a single tank.

For example, during takeoff, the second aircraft 300 can pitch up to an angle of attack (e.g., 10 degrees, 15 degrees, etc.). If the second aircraft 300 included one onboard tank to carry the same fuel capacity as six individual tanks, the majority of the LH2 would transfer behind the wing center of lift 321 during takeoff, move a center of gravity of the one onboard tank in the aft direction, and impart some undesirable instability to the second aircraft 300. However, because the second aircraft 300 includes six tanks, the respective centers of gravity 328a-328c, 330a-330c would not shift as significantly in the aft direction during takeoff relative to the example singular onboard tank, thus allowing the second aircraft 300 to maintain controllability and stability during most stages of flight (e.g., takeoff, cruise, landing, etc.).

Some disadvantages and/or challenges arise in hydrogen aircraft (e.g., the first and/or second hydrogen aircraft 100 (FIGS. 1 and 2), 300 (FIGS. 3A-3C)) with multiple (e.g., two, three, six, etc.) separate cryogenic hydrogen tanks. For example, during a refueling process, individual tanks are filled separately and sequentially via inlet ports on each tank. The refueling process for multiple individual tanks includes connecting a refueling flowline to a first tank, filling the first tank to capacity with LH2, disconnecting the refueling flowline, purging the refueling flowline, connecting the refueling flowline to a second tank in the group of tanks (e.g., the first group of tanks 324a), and repeating the refueling process until each of the individual tanks is filled to capacity.

Figure 4:
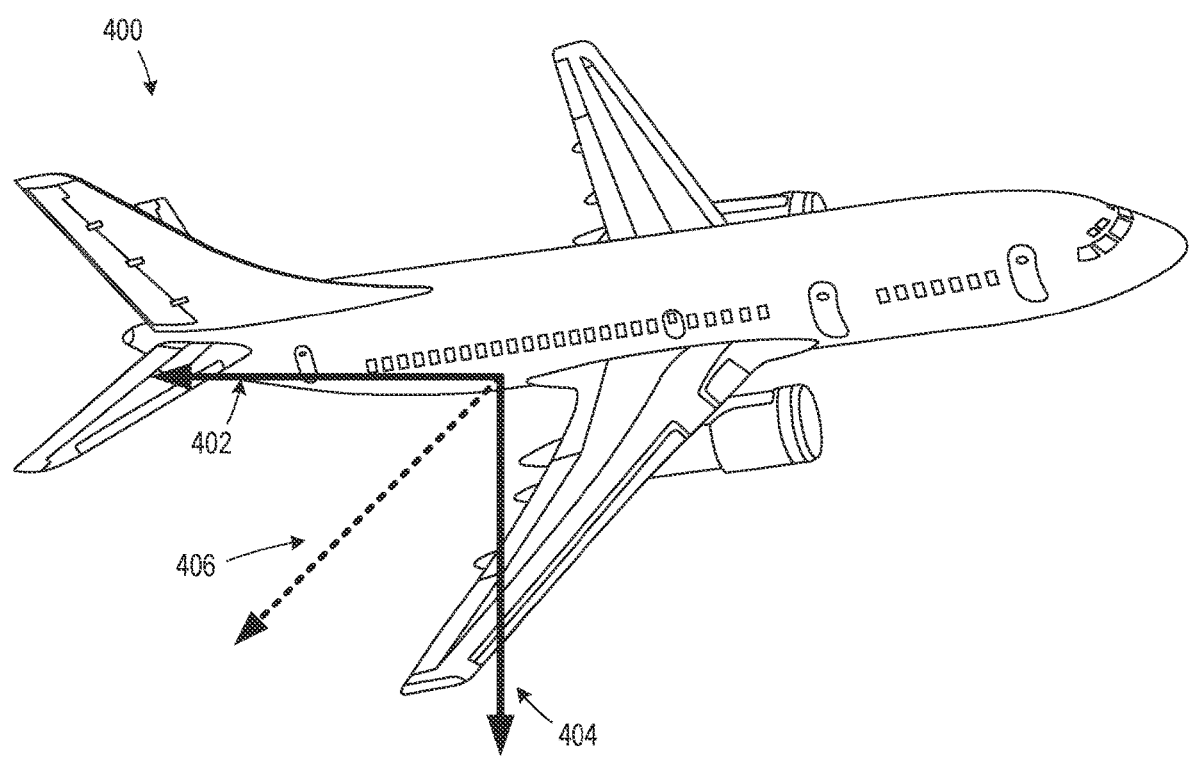
FIG. 4 is an illustration of an example aircraft that has example acceleration vectors.

Aircraft and cryogenic fuel tanks onboard can be subject to acceleration in any of six degrees of freedom: up/down, left/right, forward/backward, roll, pitch, and yaw. For example, FIG. 4 is an illustration of an isometric view of an example third aircraft 400. This example aircraft is shown to be accelerating forwards and upward at an angle of fifteen degrees, as an aircraft would during takeoff, as demonstrated by acceleration vectors 402, 404. The resultant example vector 406, shows the longitudinal loading force exerted on the aircraft and its contents, including a cryogenic hydrogen tank (not shown). An example load of 0.245 g applied across the forward acceleration vector 402 coupled with an example load of 0.065 g applied by the upward acceleration vector 404 results in 0.250 g of acceleration at the fifteen degree angle. In an example thirty percent full cryogenic LH2 fuel tank with a length of 3327.4 mm and a nominal inner radius of 839.3 mm, applying the example load for one second results in the magnitude of slosh exceeding 2.500 meters per second after 3 seconds. This can result in boil-off of the LH2 or an imbalance force and moment on the aircraft.

Figure 5A:
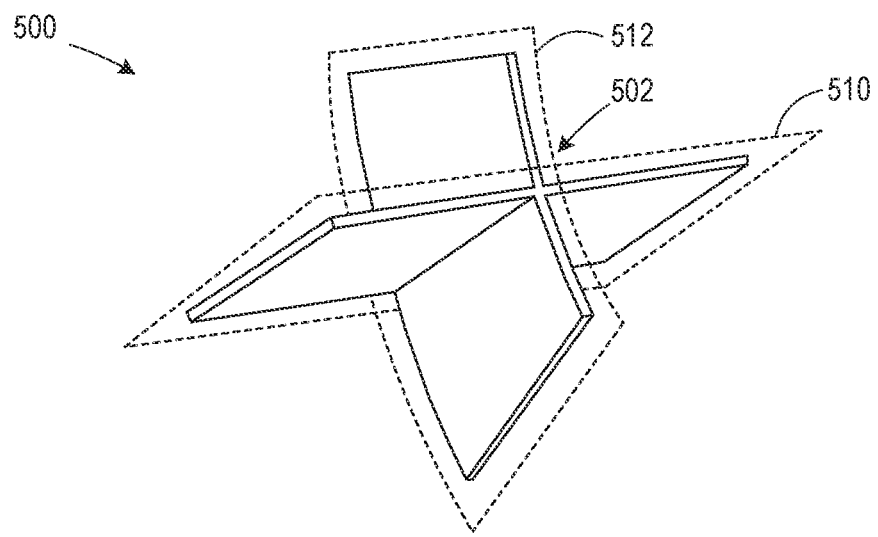
FIG. 5A is an illustration of an isometric view of an example isolated baffle.

To mitigate fuel slosh that results in boil-off of LH2 or substantial imbalance forces and moments on aircraft, baffles are used. FIG. 5A presents an isometric view of an example baffle 500 that can be used in conjunction with a cryogenic fuel tank (shown later in FIG. 8) to mitigate cryogenic fuel slosh. The example baffle 500 has a baffle core 502. In some examples, the baffle core 502 is hollow, whereas the baffle core 502 is solid in other examples.

Material used to construct the baffle core 502 includes magnetorheological materials such as foamed aluminum, carbon fiber composites, glass fiber composites, steel foam, a combination of materials, and/or other composite structures. These magnetorheological materials give the baffle a variable stiffness such that two baffles constructed of the same material may have two different stiffnesses. Additionally, the magnetorheological materials give the baffle the property that the stiffness within each baffle varies. In some examples, the baffle 500 is constructed of materials with compliance to allow the baffle structure to deform to reduce the slosh of cryogenic fuel.

Figure 5B:
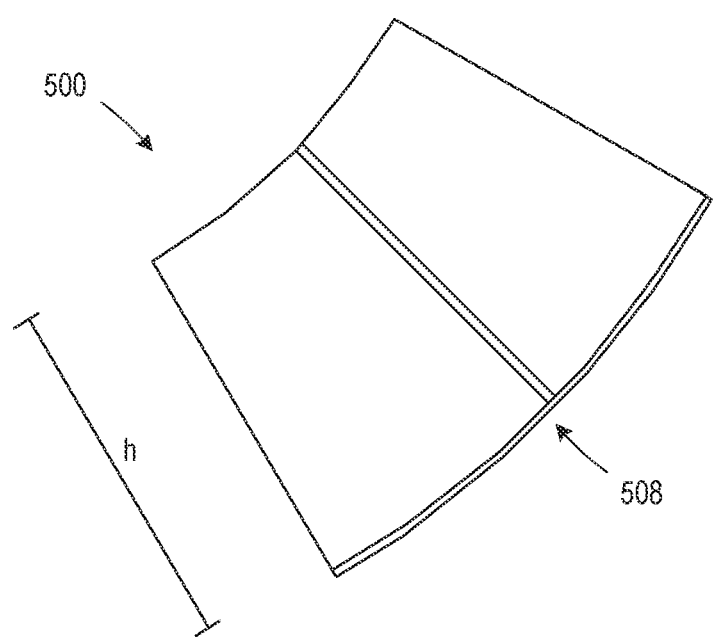
FIG. 5B is an illustration of a side view of the example isolated baffle.

FIG. 5B shows a side view of the example baffle 500 in isolation. In the example of FIG. 5B, the baffle 500 is angular, meaning the baffle 500 has a base 508 that is curved to match a curved inner surface of the cryogenic fuel tank, shown later in FIG. 8. This angular feature helps prevent fuel from passing under the baffle and dampens potential fuel slosh by an imposition of the example baffle in a fluid path though the cryogenic fuel tank.

A height of an example baffle is greater than a minimum height to ensure that fuel does not simply pass over the top of the baffle without the baffle imposing a structure to dampen movement of the fuel. A height of the baffle that is less than a maximum height minimizes or otherwise reduces the weight of the baffle, is more efficient in terms of fueling by ensuring that there is no need to compartmentalize the tank or use pumps to circulate the fuel, and does not induce additional sloshing of the liquid hydrogen fuel. In the example of FIG. 5B, the baffle 500 is of an example height perpendicular to the baffle base 508 within range of a baffle height to tank radius ratio, where $0 < \text{baffle height/tank radius} \leq 0.5$.

A size of the example baffle 500 helps determine its effectiveness in mitigating cryogenic fuel slosh. A width of the baffle 500 is measured along the axis of the baffle base 508 and is constrained by a height of the baffle 500, presenting a baffle width to baffle height ratio. Having a minimum width ensures imposition of the baffle 500 in any potential fluid path, mitigating fuel slosh. By having a range on the baffle width/baffle height ratio, the baffle 500 is constrained to allow space between the baffles and not compartmentalize the example cryogenic fuel tank. In the example of FIG. 5B, a baffle width to baffle height ratio of the baffle 500 is in the range of $0.5 \leq \text{baffle width/baffle height} \leq 1.5$.

Figure 5C:
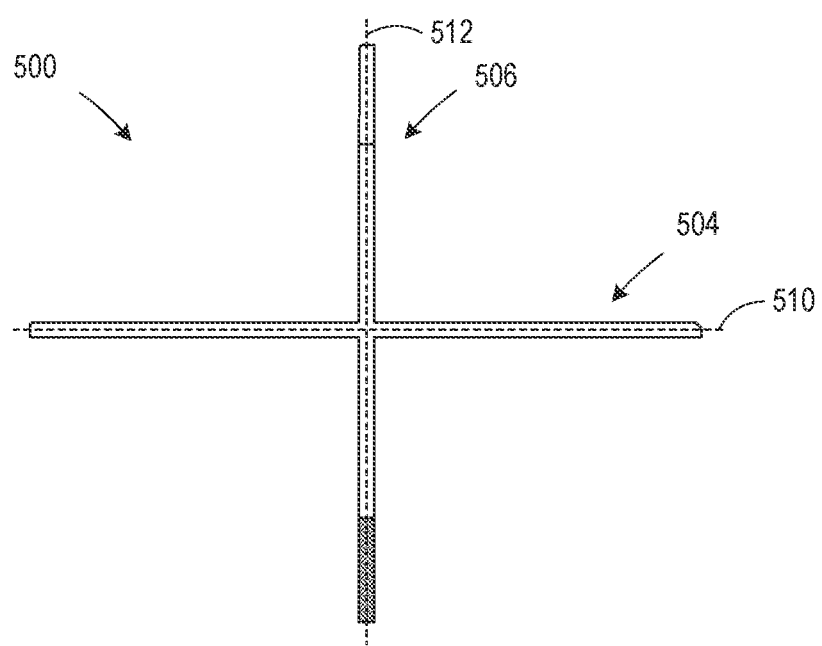
FIG. 5C is an illustration of a top view of the example isolated baffle.

FIG. 5C shows example baffle 500 from a top view. Baffle 500 has a first member 504 extending along a first plane 510 in a first direction, and a second member 506 extending along a second plane 512 in a second direction. In this example, the baffle 500 has the first member 504 extending along the first plane 510 perpendicular to the second member 506 extending along the second plane 512. Not all baffles include the members as perpendicular or straight. Some example baffle planes are curved, cosine, or are sinusoidal, as shown later in FIG. 13.

Baffle members can be non-porous or unslotted to prevent the passage of fluid through the baffle. As an alternative, the baffle members can be porous to allow the passage of fluid through holes or slots and mitigate fluid impacting the surface of the baffle. Usage of a non-porous or unslotted baffle dampens potential fuel slosh by an imposition of the example baffle in a fluid path though the cryogenic fuel tank. An advantage to utilizing a porous baffle is a reduction in surface area impacted when fuel is subject to acceleration. By reducing the surface area through the introduction of pores, such as holes or slots, less fuel impacts the baffle and, therefore, less fluid splashing occurs. Less fuel splashing dampens the fuel motion. Another advantage of having a porous baffle includes weight reduction of the baffle.

Figure 6:
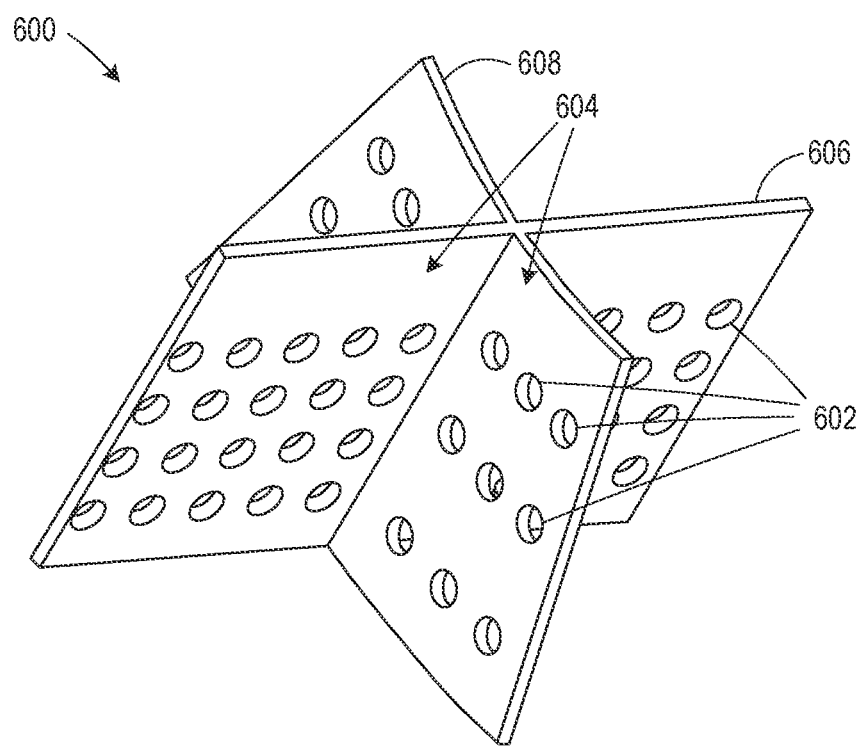
FIG. 6 is an isometric view of an example porous baffle.

While FIG. 5B shows an example non-porous baffle 500, FIG. 6 shows an example porous baffle 600. In this example, the baffle members are slotted or porous to allow fuel to pass through. Example holes 602 enable fluid motion, reducing the amount of fuel impacting the surfaces 604 of members 606, 608 of the baffle 600 and resulting splash. The fuel slosh is dampened, as there is less fluid splashing within an example cryogenic fuel tank.

Figure 7:
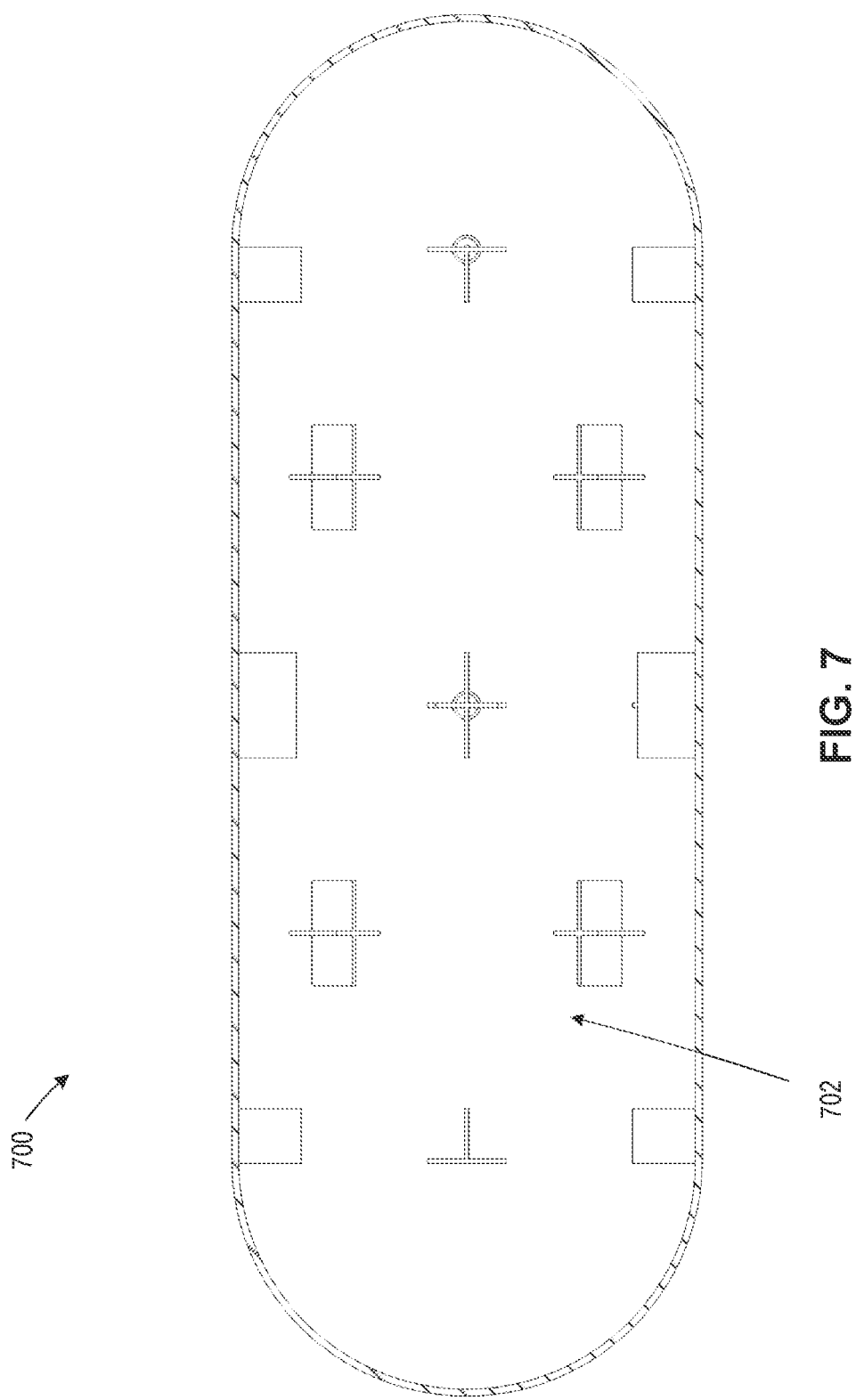
FIG. 7 is an illustration of an example cross-sectional top view of a fuel tank with a system of baffles.

FIG. 7 shows a top view of an example cryogenic fuel tank 700. In this example, an example baffle base 508 is connected to an inner surface of a cryogenic fuel tank 702. In this example, the baffle base 508 is connected to the cryogenic fuel tank inner surface 702 by welding. In other examples, epoxy-based adhesives may be used to attach a baffle to a cryogenic fuel tank inner surface. Connecting the baffle base 508 to the inner surface of the cryogenic fuel tank via welding or epoxy-based adhesive gives rigidity to the structure and ensures potential fuel slosh is dampened by an imposition of the example baffle in a fluid path though the cryogenic fuel tank.

Figure 8:
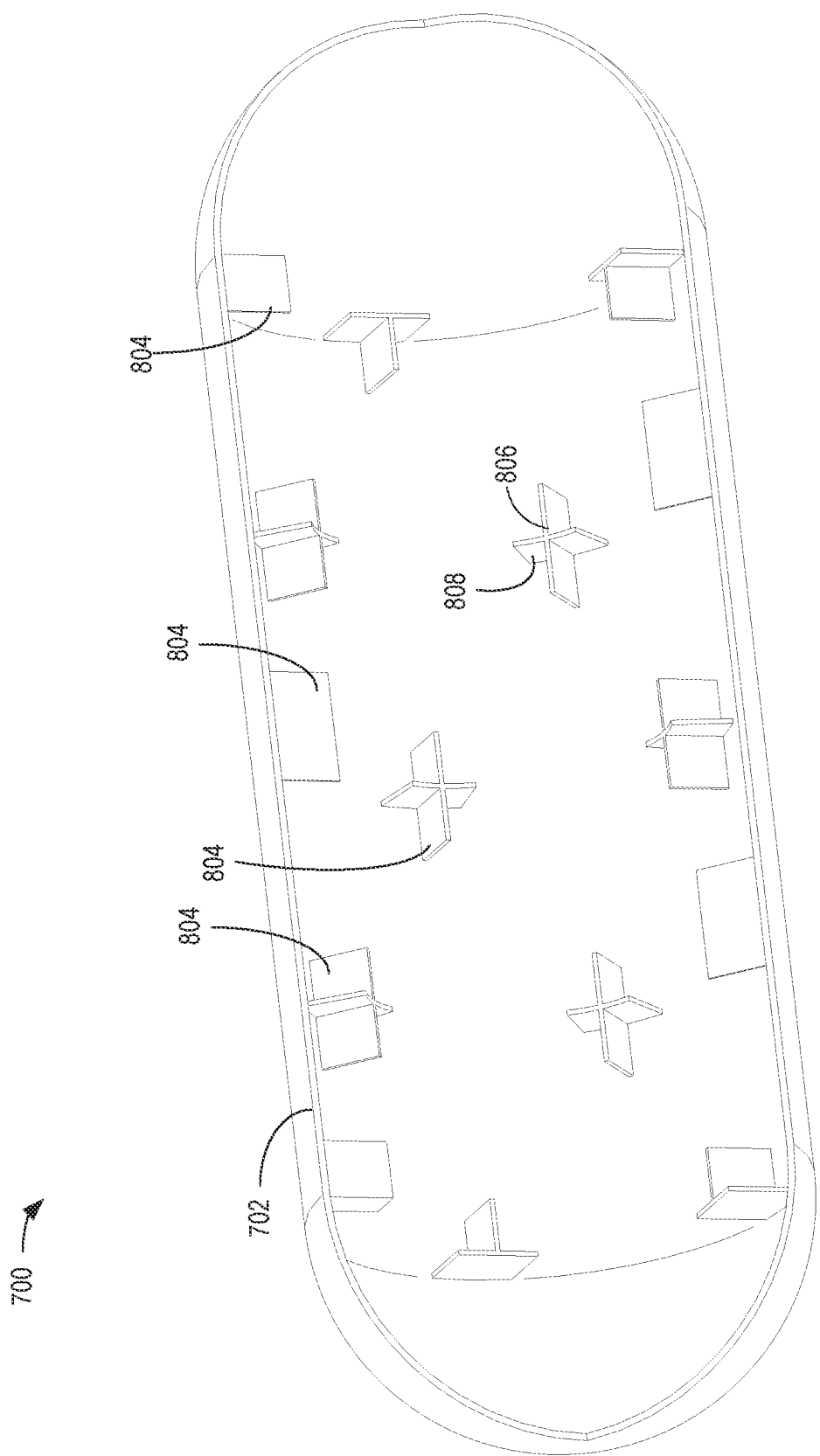
FIG. 8 is an illustration of an example cross-sectional isometric view of a fuel tank with a system of baffles.

FIG. 8 illustrates an isometric view of the example cryogenic fuel tank 700 to hold a cryogenic fuel, such as liquid hydrogen. In this example, the cryogenic fuel tank 700 has a system of baffles 804 connected to its inner surface 702 to mitigate cryogenic fuel slosh. The plurality of baffles 804 works to dampen the fuel slosh in multiple directions by having members 806, 808 extending in two different planes to dampen the fluid movement in all directions of acceleration experienced by the aircraft. The example system of baffles 804 is connected to the inner surface 702 of the cryogenic fuel tank 700.

Dampening cryogenic fuel slosh is dependent on many factors such as the location of the baffles along the length of the cryogenic fuel tank, the location of the baffles around the circumference of the cryogenic fuel tank (also referred to as the angle of stagger), the number of baffles along the length of the cryogenic fuel tank, and the number of baffles along the circumference of the fuel tank. The example system of baffles 804 is constrained based on a ratio of a size of each baffle, circumferential spacing between baffles within a set, and axial spacing between sets of baffles. The three constraints yield a density of baffles within an example cryogenic fuel tank.

Figure 9A:
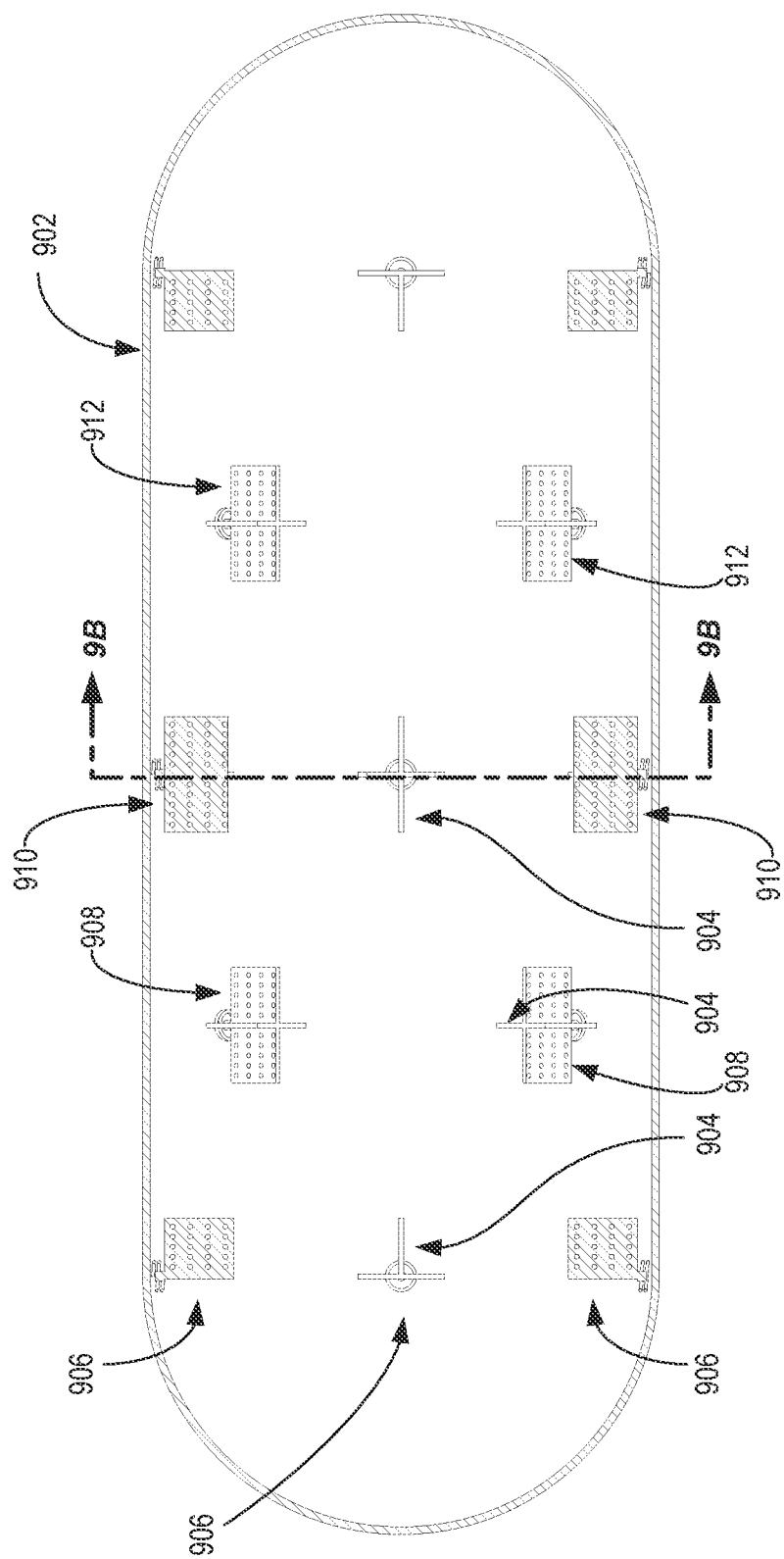
FIG. 9A is an illustration of a cross-sectional top view of a first arrangement of baffles.

FIG. 9A shows an example top view of a system of baffles 904 circumferentially spaced around the inner surface 902 of a cryogenic fuel tank 900. A set of four circumferentially spaced baffles at six axial positions is shown. To highlight the number of baffles 904 at a location along the length of the cryogenic fuel tank 900, a portion of cryogenic fuel tank 900 is shown to be cross sectioned and later depicted in FIG. 9B.

The example baffles of FIG. 9A highlight an alternating spatial configuration showing first set of baffles 906 and third set of baffles 910 along the length of the cryogenic fuel tank 900 being aligned in the axial direction. A second set of baffles 908 and fourth set of baffles 912 along the length of the cryogenic fuel tank 900 are shown as being aligned in the axial direction. In this example, there is an angle of stagger between the first set of baffles 906 and the second set of baffles 908. In this example, the third set of baffles 910 is eclipsed by the first set of baffles 906, and the fourth set of baffles 912 is eclipsed by the second set of baffles 908.

Figure 9B:
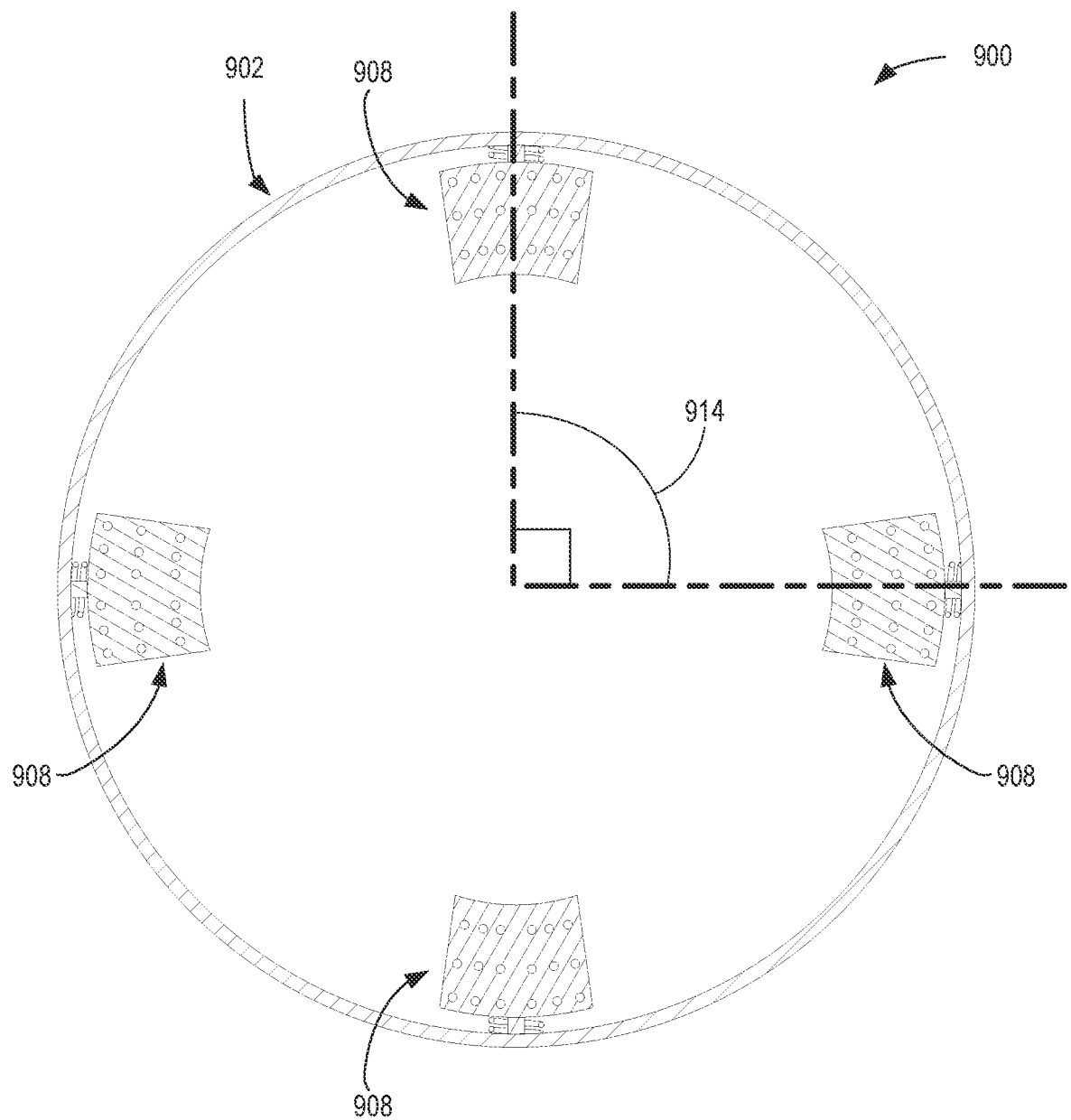
FIG. 9B is an illustration of a cross-sectional end view of the first arrangement of baffles.

FIG. 9B shows a cross-sectioned view 9B of cryogenic fuel tank 900 of FIG. 9A. As shown in FIG. 9B, the inner surface 902 of the cryogenic fuel tank 900 has a set of four baffles 908. The set of four baffles 908 are spaced out along the circumference of the cryogenic tank inner surface 902 equidistant. As shown by angle 914, each baffle is separated circumferentially by 90 degrees in this configuration.

Figure 10A:
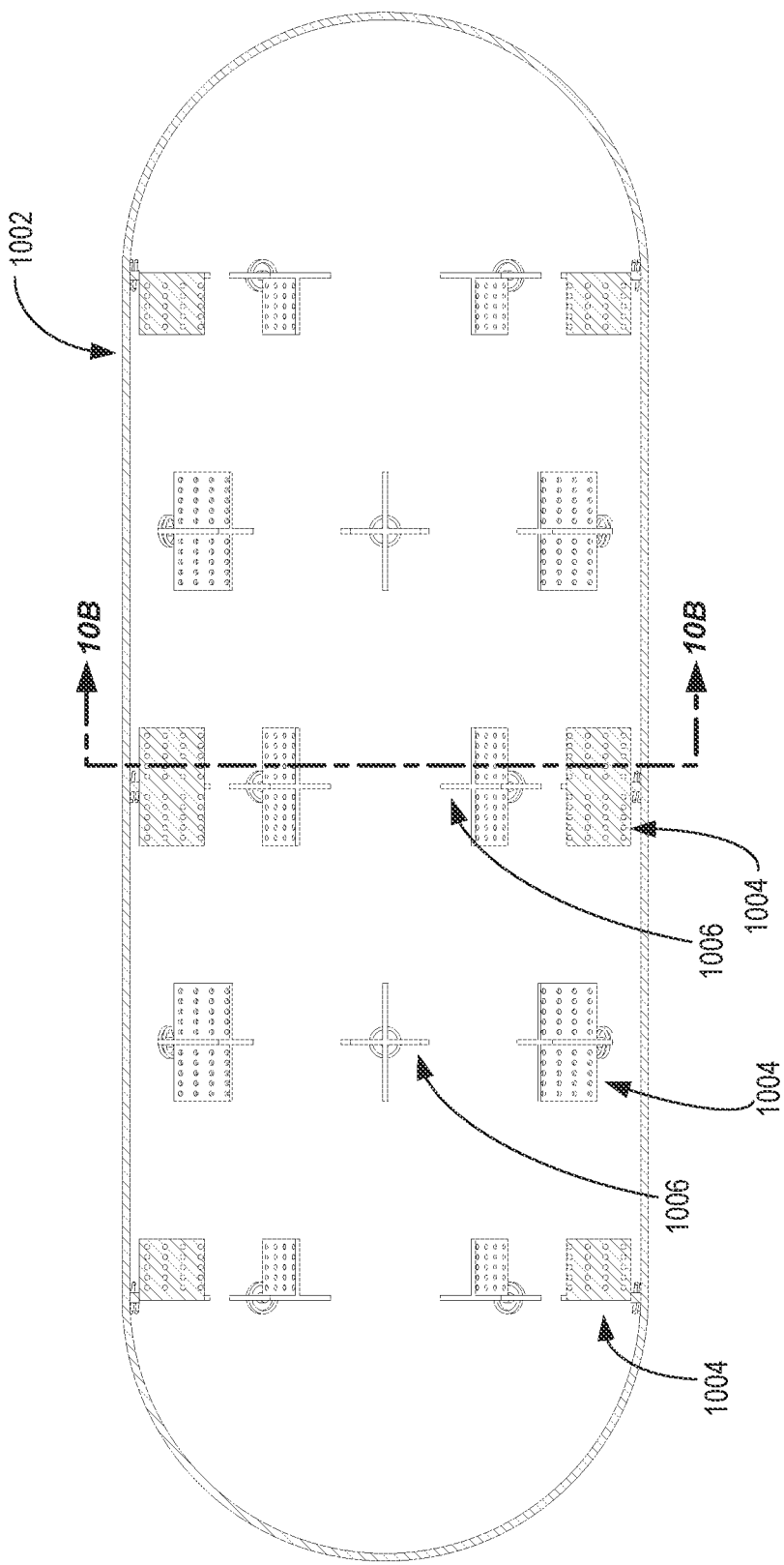
FIG. 10A is an illustration of a cross-sectional top view of a second arrangement of baffles.

FIG. 10A shows an alternate example in which a cryogenic fuel tank 1000 has a system of baffles 1004 that are placed closer together as compared to FIG. 9A. FIG. 9A highlights an angle of 90 degrees between baffles, whereas FIG. 10A shows an arrangement of baffles having an angle of 60 degrees. In this example, there are six baffles arranged circumferentially around an inner surface 1002 of a cryogenic fuel tank 1000 at five different axial positions along the longitudinal axis along the length of the example cryogenic fuel tank 1000. A portion of cryogenic fuel tank 1000 is shown to be cross sectioned and later depicted in FIG. 10B. In yet other examples, the size of the baffles is smaller, but the number of baffles is increased.

Figure 10B:
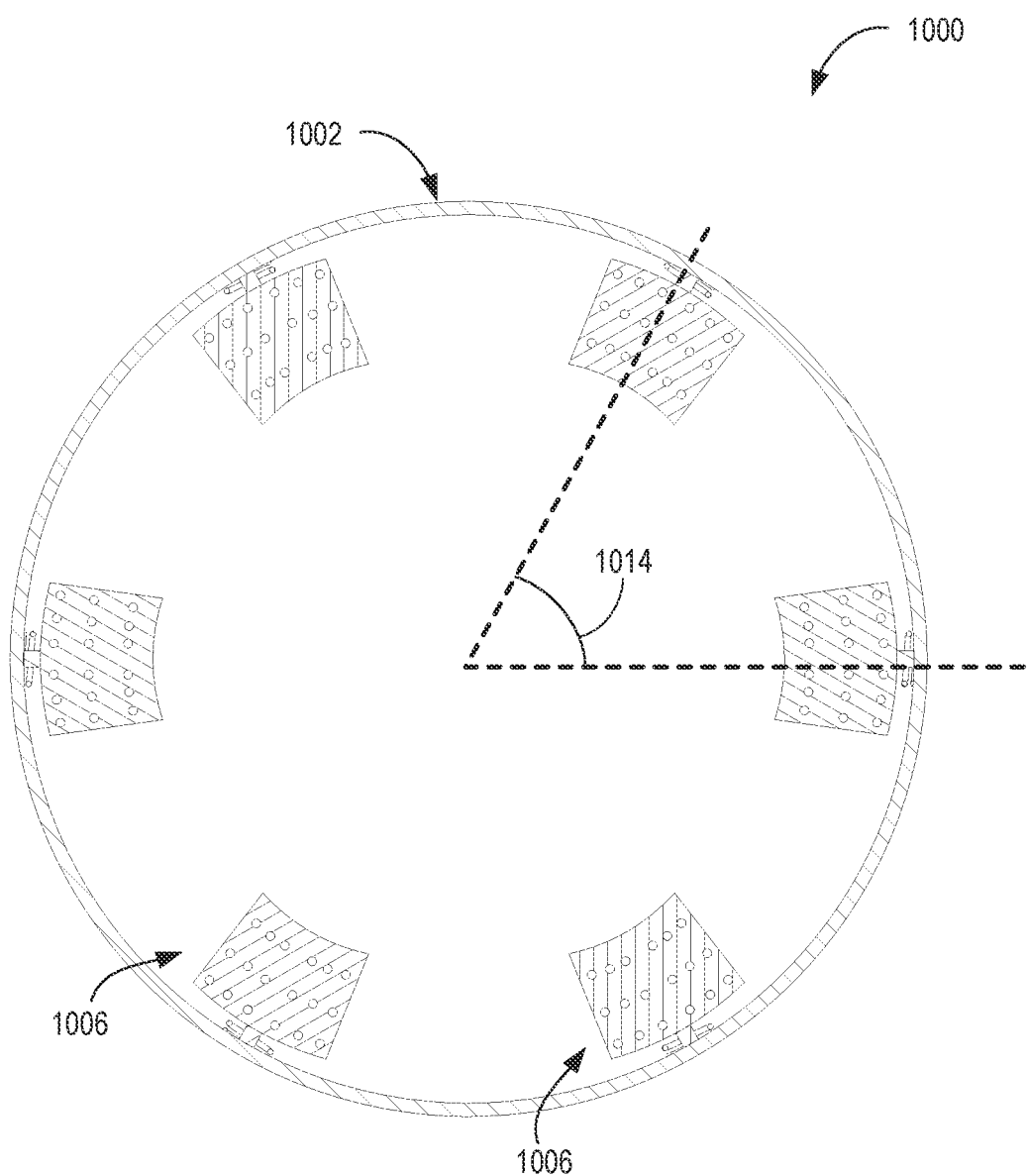
FIG. 10B is an illustration of a cross-sectional end view of the second arrangement of baffles.

FIG. 10B shows a cross-sectioned view 10B of cryogenic fuel tank 1000 of FIG. 10A. As shown in FIG. 10B, the inner surface 1002 of the cryogenic fuel tank 1000 has six baffles 1006 attached at any given location along the length of the cryogenic fuel tank 1000. The baffles 1006 are spaced out along the circumference of the cryogenic tank inner surface 1002 equidistant. As shown by angle 1014, each baffle is separated circumferentially by 60 degrees in this configuration.

There are many different configurations for baffle placement inside of a cryogenic fuel tank. Additional configurations may include different patterns or randomization. The example patterns for baffle placement are not exclusive.

FIG. 11A highlights an angle of stagger between a first set of baffles 1102 and an adjacent second set of baffles 1104. A cross-sectional view 11B is taken from a first location 1101 along the length of an example cryogenic fuel tank 1100. The first set of baffles 1102 is spaced circumferentially around the circumference of the cryogenic fuel tank 1100 at the first location 1101. A second set of baffles 1104 is spaced circumferentially around the circumference of the cryogenic fuel tank 1100 at a second location 1103 along the length of the example cryogenic fuel tank 1100. The second set of baffles 1104 is offset circumferentially, or staggered, with respect to the first set of baffles 1102. As such, the second set of baffles 1104 do not to align with the first set of baffles 1102 in the axial direction as shown in FIG. 11A.

Figure 11B:
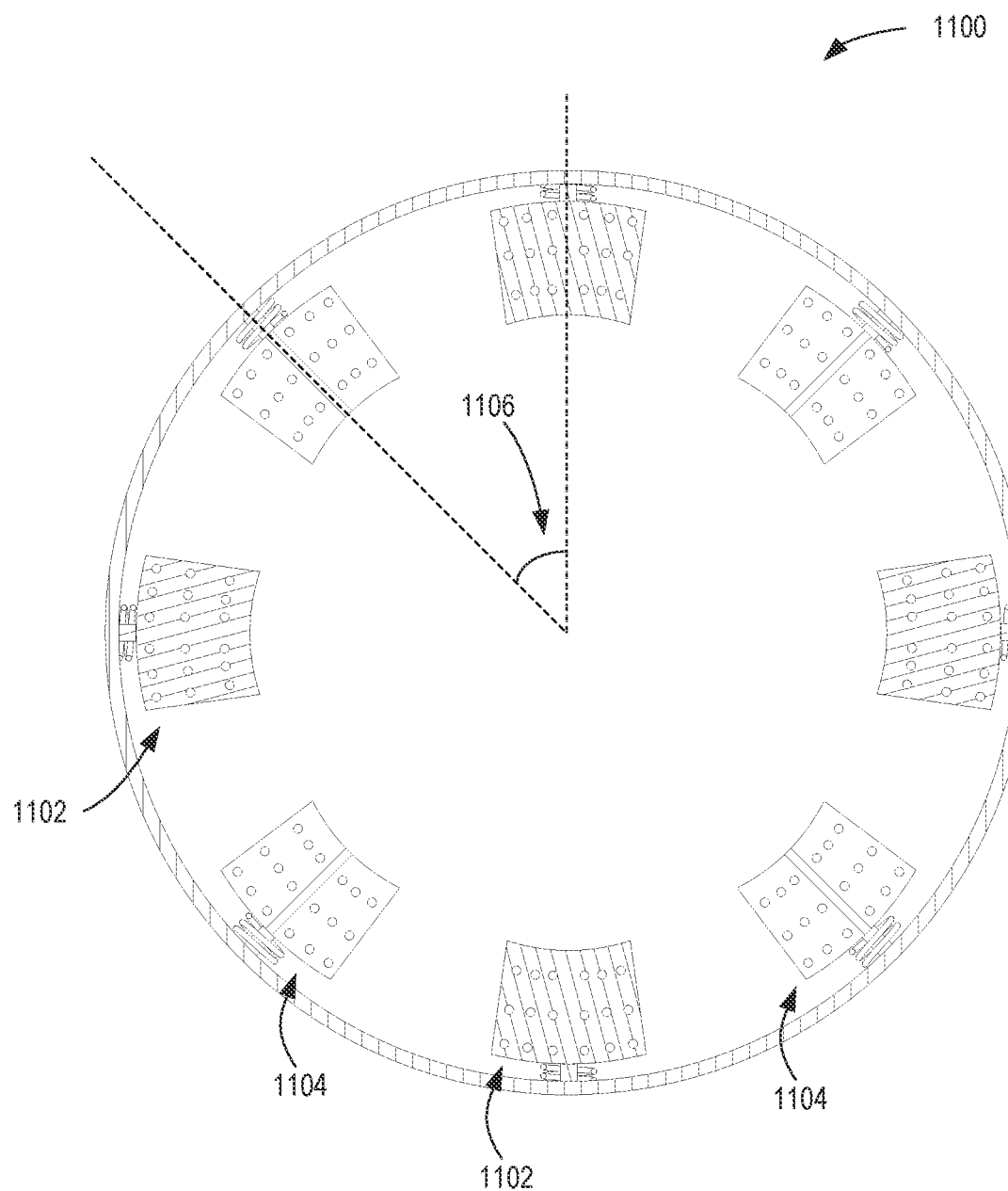
FIG. 11B is an illustration of a cross-sectional end view of the third arrangement of baffles with the angle of stagger.

FIG. 11B shows a cross sectioned view of the example cryogenic fuel tank 1100 of FIG. 11A. This cross sectioned view includes a first set of baffles 1102 and second set of baffles 1104. In this example, each baffle of the first set of baffles 1102 is placed at equal distances around the circumference of the inner surface of the cryogenic fuel tank 1100. Additionally, each baffle of the second set of baffles 1104 is placed at equal distances around the circumference of the inner surface of the cryogenic fuel tank 1100.

The first and second sets of baffles are angularly offset, so that in this cross-sectioned view, all baffles from the first set of baffles 1102 and all baffles from the second set of baffles 1104 are visible. The degree to which the second set of baffles 1102 is offset from the first set of baffles 1104 is referred to as an angle of stagger 1106. In this example, the angle of stagger 1106 is constant from baffle to baffle for the entire circumference, regardless of location along the length of the cryogenic fuel tank 1100. This example shows a four baffle per baffle set, resulting in a constant 45 degree angle of stagger 1106. In some examples, the angle of stagger 1106 is greater than 45 degrees. In other examples, the angle of stagger 1106 is less than 45 degrees. In still other examples, the angle of stagger 1106 varies, for example, where sets of baffles have different circumferential spacing than one another, different numbers of baffles, and/or unequal spacing.

In some examples, the baffle base (shown in FIG. 5B) includes a torsion spring (shown in FIGS. 12A and 12B) at the center of the baffle. The torsion spring at the center of the baffle base connects to the inner surface of the cryogenic fuel tank to allow the example baffle to rotate in the rotational direction (about the z-axis shown in FIG. 12B). The torsion spring acts as a control to adapt to various fuel fill levels and acceleration profiles by enabling motion in the directions shown.

One motion is a twisting motion. By utilizing a torsion spring, a twisting motion is enabled wherein the baffle may rotate in a rotational direction. The energy required to rotate the baffle comes from a kinetic energy of the fuel moving in the tank. By consuming the kinetic energy of the fuel, the fuel has less kinetic energy to create slosh within the cryogenic fuel tank.

Figure 12B:
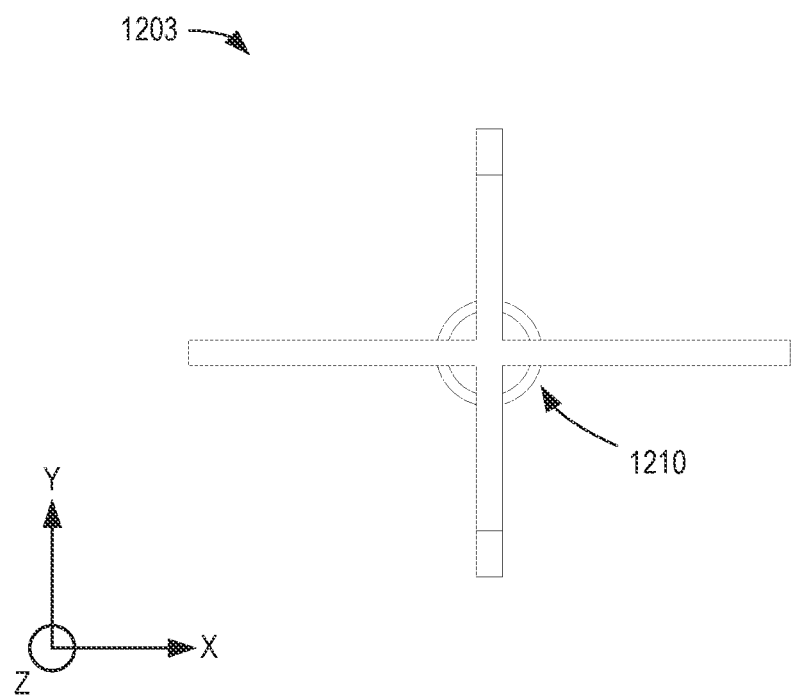
FIG. 12B is an illustration of a top view of a baffle with a torsion spring.

A bending motion is also enabled from the use of a torsion spring. An example baffle with a torsion spring has the ability to have its members bend back and forth along the length of the tank or perpendicular to the length of the tank (along the x-axis or the y-axis as shown in FIG. 12B). Similar to the twisting motion, the bending motion requires kinetic energy from the fuel to move. By consuming the kinetic energy of the fuel, the fuel has less kinetic energy to create slosh within the cryogenic fuel tank. Using the torsion spring to attach the baffle to the inner surface of the cryogenic fuel tank has the benefit of reducing cryogenic fuel slosh.

In the example shown in FIG. 7, the baffles shown are fixed in place to dampen fuel slosh. In contrast, FIG. 12A demonstrates a perspective view of an example cryogenic fuel tank 1200 with a plurality of baffles 1202. In this example, each baffle of the plurality of baffles 1202 is attached to the cryogenic fuel tank 1200 with a torsion spring 1210 at the base of the center of the baffle. By allowing each baffle of the example plurality of baffles 1202 to rotate with a twisting motion 1204 and bend with a bending motion 1206, the potential fuel slosh is further dampened by requiring energy from the moving fuel to twist or bend the plurality of baffles 1202.

FIG. 12B is a top view of an example baffle of the plurality of baffles 1202 from FIG. 12A. A torsion spring 1210 at the base of the center is shown. As depicted in FIG. 12A, the torsion spring 1210 enables both bending (along the x-axis or the y-axis) and twisting (about the z-axis) motions. The spring 1210 allows the baffle 1202 to rotate or bend with motion of the fuel. Kinetic energy of the fuel is transferred to potential energy in the spring, dampening any potential fuel slosh.

The example baffles depicted previously show a system of baffles having the same member arrangement and shape. In alternate examples, a combination of different baffle member arrangements is used to dampen the cryogenic fuel slosh.

Figure 13:
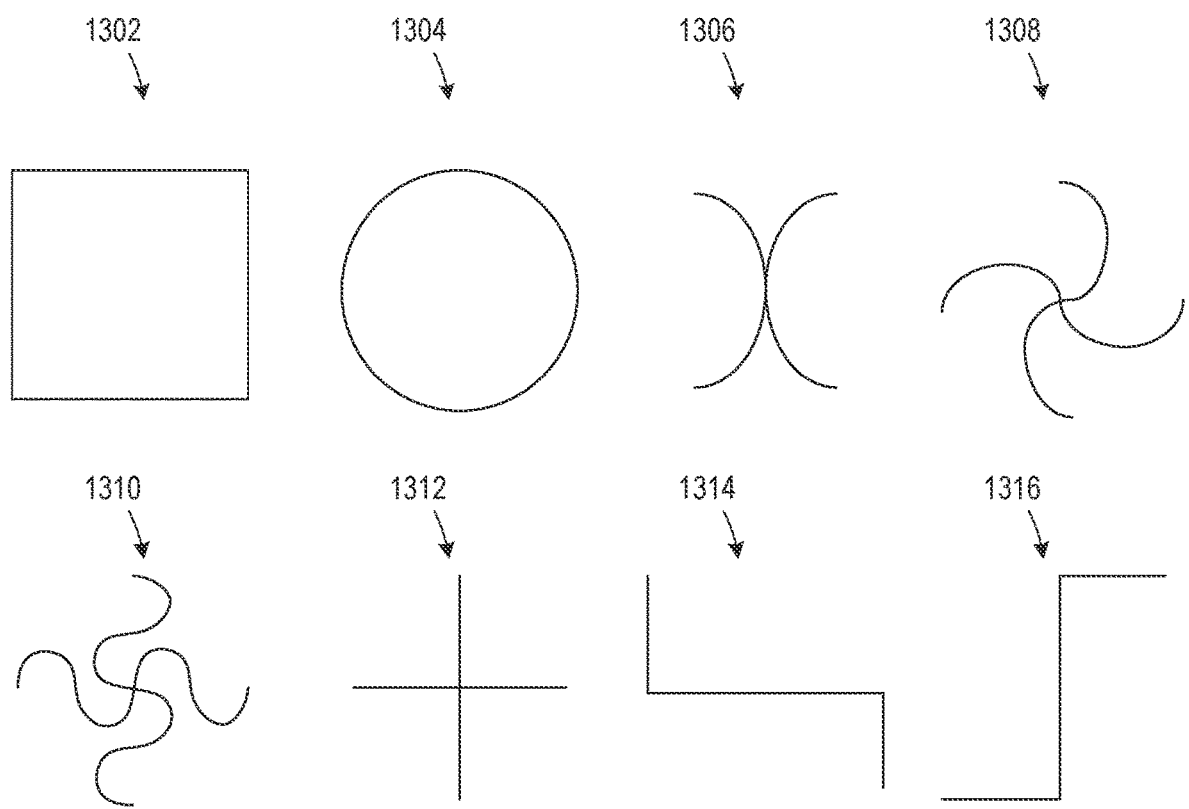
FIG. 13 is an illustration of a variety of different example baffle shapes.

FIG. 13 is a simplified top view illustration of a variety of baffle member arrangements similar to the baffle shown in isolation in FIG. 5A. From the example in FIG. 5C, each example baffle has at members on two different planes. Members positioned in two different planes can be used to form a cross wing baffle 1312, similar to the baffles shown in the plurality of baffles 804 in FIG. 8. Additionally, a baffle can be formed as a square baffle 1302, a circular baffle 1304, an inverted semicircular baffle 1306, a cross-cosine baffle 1308, a cross-sine baffle 1310, or a stepwise baffle 1314, 1316. These different member arrangements deflect fluid movement in multiple directions and address the issue of cryogenic fuel slosh resultant of acceleration in all six degrees of freedom that an aircraft may experience in operation.

Figure 14:
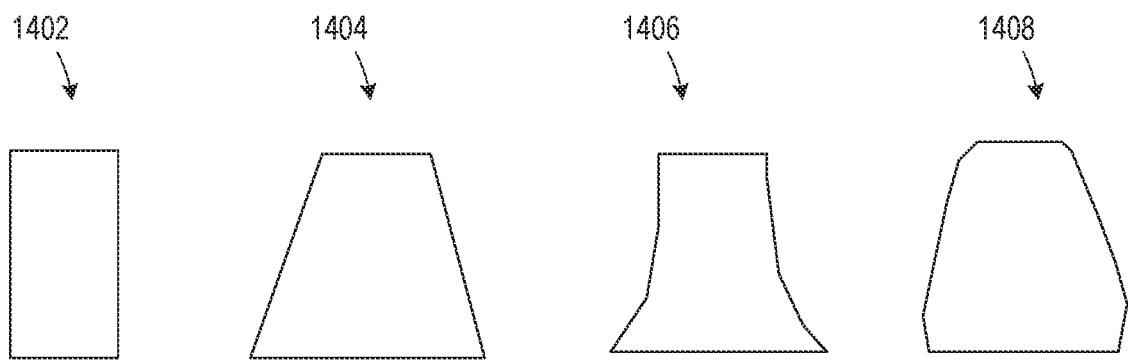
FIG. 14 is an illustration of example shapes in which example baffles can be formed.

FIG. 14 is an illustration of various example baffle side views. Similar to the baffle 500 shown in FIG. 5B, the baffles shown in FIG. 14 include fabrications to a height ratio of the range 0<baffle height/tank radius≤0.5, to dampen potential fuel movement. The shape of the fabrication can be in various forms such as uniform 1402, conical 1404, concave 1406, and/or convex 1408.

Baffles can be made from various methods of manufacture. For example, a baffle could be made from additive manufacturing or could be fabricated via solidification expansion of an aluminum foam.

Figure 15:
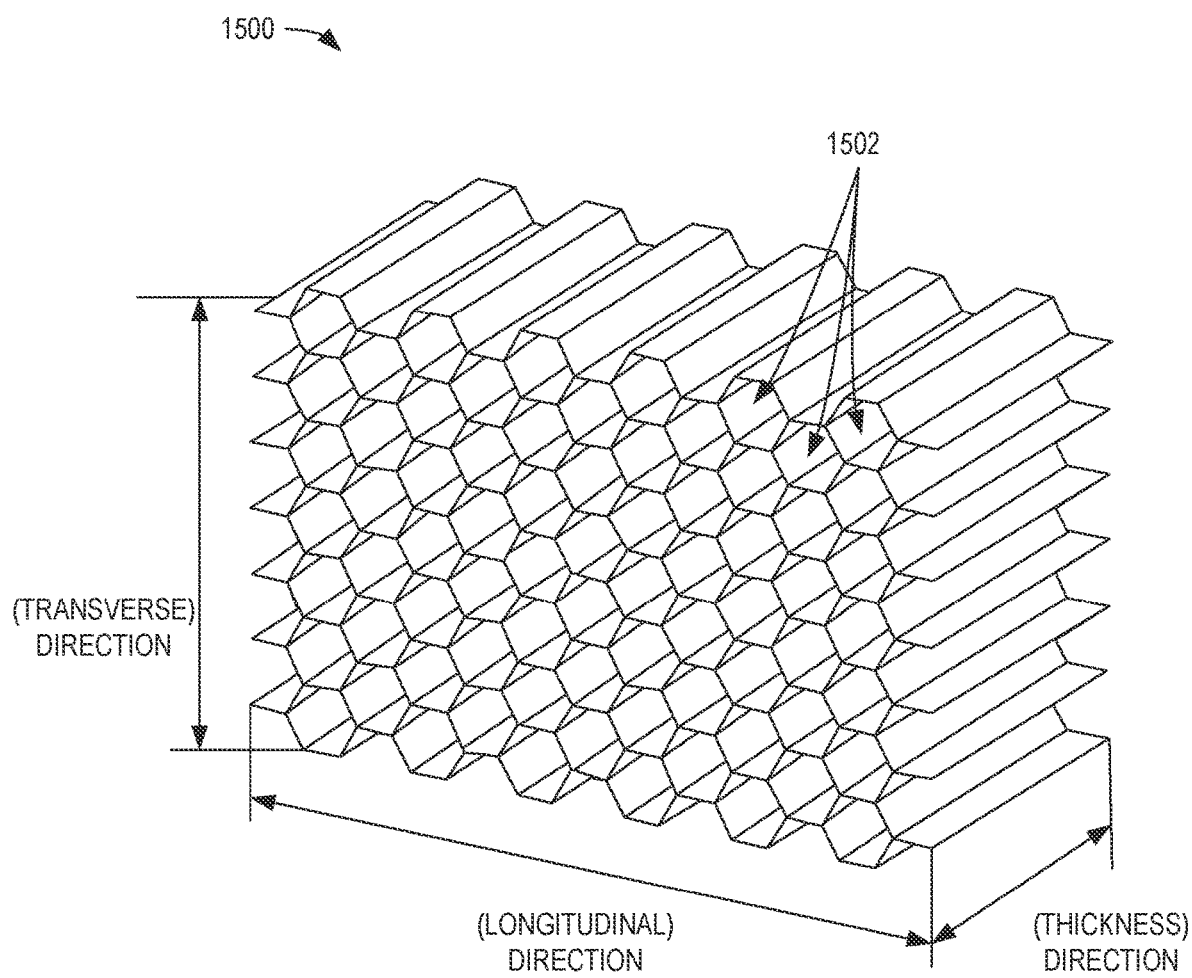
FIG. 15 is an illustration of an example baffle in a honeycomb structure.

FIG. 15 is an example baffle 1500 made in a honeycomb structure using an additive manufacturing process. The honeycomb structure 1500 of FIG. 15 can be affixed to the inner surface of the cryogenic fuel tank (e.g., the cryogenic fuel tank 700 of FIGS. 7-8). The example honeycomb structure 1500 uses the porosity described earlier to enable fluid flow through the honeycomb elements 1502. By enabling fluid flow through elements or passages 1502 of the honeycomb structure 1500, the fluid does not impact the baffle as much as the fluid would impact a solid structure. Relatively less fluid impact correlates to less fuel sloshing. Additionally, the hollow structure of the honeycomb is, by design, lightweight.

From the foregoing, it will be appreciated that example apparatuses and articles of manufacture have been disclosed that decrease weight and cost of baffle designs, remove compartmentalization of cryogenic fuel tanks and the associated need for fuel circulating pumps, and mitigate fuel slosh while allowing controlled mixing of fuel and vapors to reduce hydrogen stratification in cryogenic fuel tanks.

Example methods, apparatus, systems, and articles of manufacture to cryogenic fuel dampening baffles are disclosed herein. Further aspects of the disclosure are provided by the subject matter of the following clauses:

A cryogenic fuel tank comprising an inner surface defining an interior of the cryogenic fuel tank to hold a fuel, and a plurality of baffles including a first baffle, the first baffle including a first member extending along a first plane, and a second member extending along a second plane, the first plane different from the second plane, the second member connected to the first member, the plurality of baffles connected to the inner surface.

The cryogenic fuel tank of any preceding clause, wherein the inner surface is a curved inner surface.

The cryogenic fuel tank of any preceding clause, wherein at least one of the first member or the second member is deformable.

The cryogenic fuel tank of any preceding clause, wherein at least one of the first member or the second member includes a magnetorheological material.

The cryogenic fuel tank of any preceding clause, wherein the magnetorheological material includes at least one of foamed aluminum, carbon fiber composites, glass fiber composites, or steel foam.

The cryogenic fuel tank of any preceding clause, wherein the first baffle includes an opening in at least one of the first member or the second member.

The cryogenic fuel tank of any preceding clause, wherein the plurality of baffles includes a second baffle, the second baffle including a third member extending along a third plane, and a fourth member extending along a fourth plane, the third plane different from the fourth plane, the fourth member connected to the third member.

The cryogenic fuel tank of any preceding clause, wherein the first baffle is connected to the inner surface by a torsion spring to allow the first baffle to rotate in a rotational direction.

The cryogenic fuel tank of any preceding clause, wherein the first baffle is connected to the inner surface by a torsion spring to allow the first baffle to bend.

The cryogenic fuel tank of any preceding clause, wherein at least one of the first member or the second member has at least one of a uniform shape, a conical shape, concave shape, or a convex shape.

The cryogenic fuel tank of any preceding clause, wherein at least one of the first member or the second member has a honeycomb structure.

A system of baffles to dampen movement of a cryogenic fuel in a cryogenic fuel tank, the system of baffles comprising a first baffle, the first baffle including a first surface to dampen fuel movement in at least a first direction, and a second baffle, the second baffle including a second surface to dampen fuel movement in at least a second direction, the second direction being different from the first direction, each baffle of the system of baffles being connected to the cryogenic fuel tank.

The system of baffles of any preceding clause, wherein a base of the first baffle is curved to match a curved inner surface of the cryogenic fuel tank.

The system of baffles of any preceding clause, wherein at least one of the first baffle or the second baffle deforms to dampen movement of the cryogenic fuel.

The system of baffles of any preceding clause, wherein at least one surface of a baffle includes an opening to allow the cryogenic fuel to pass through.

The system of baffles of any preceding clause, wherein a baffle is connected to the cryogenic fuel tank by a torsion spring to allow the baffle to rotate in a rotational direction.

The system of baffles of any preceding clause, wherein a baffle is connected to the cryogenic fuel tank by a torsion spring to allow the baffle to rotate.

The system of baffles of any preceding clause, wherein each core of each baffle includes a magnetorheological material.

The system of baffles of any preceding clause, wherein the magnetorheological material includes at least one of foamed aluminum, carbon fiber composites, glass fiber composites, or steel foam.

The system of baffles of any preceding clause, wherein at least one of the first baffle or the second baffle has at least one of a uniform shape, a conical shape, a concave shape, a convex shape, or a honeycomb shape.

A means for dampening movement of a cryogenic fuel in a cryogenic fuel tank, the means including a first surface to dampen fuel movement in at least a first direction, and a second surface to dampen fuel movement in at least a second direction, the second direction being different from the first direction, each means being connected to the cryogenic fuel tank.

The means for dampening movement of any preceding clause, wherein a base of the means matches a curved inner surface of the cryogenic fuel tank.

The means for dampening movement of any preceding clause, wherein a surface of the means deforms to dampen movement of the cryogenic fuel.

The means for dampening movement of any preceding clause, wherein at least one surface the means includes an opening to allow the cryogenic fuel to pass through.

The means for dampening movement of any preceding clause, wherein a means is connected to the cryogenic fuel tank by a torsion spring to allow the baffle to rotate in a rotational direction.

The means for dampening movement of any preceding clause, wherein the means is connected by a torsion spring to allow the baffle to bend.

The means for dampening movement of any preceding clause, wherein the means includes a magnetorheological material.

The means for dampening movement of any preceding clause, wherein the magnetorheological material includes at least one of foamed aluminum, carbon fiber composites, glass fiber composites, or steel foam.

The means for dampening movement of any preceding clause, wherein the means has at least one of a uniform shape, a conical shape, a concave shape, a convex shape, or a honeycomb shape.

A method of manufacturing a baffle by additive manufacturing, the baffle including a first surface to dampen fuel movement in at least a first direction, and second surface to dampen fuel movement in at least a second direction, the second direction being different from the first direction.

The following claims are hereby incorporated into this detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A fuel tank including a system of baffles, the system of baffles comprising:
    a first baffle, the first baffle including:
        a first member to dampen fuel movement in at least a first direction; and
        a second member intersecting the first member, the second member to dampen the fuel movement in at least a second direction, a first portion of the second member extending from a first side of the first member and a second portion of the second member extending from a second side of the first member, the second side opposite the first side, wherein the first baffle has a base and a height, the base to connect the first baffle to an inner surface of the fuel tank, the height to extend from the base and terminate before a ceiling of the fuel tank, and wherein the height of the first baffle dampens the fuel movement by allowing fuel to pass over a top of the first baffle; and
    a second baffle, the second baffle including a third member to dampen the fuel movement in at least the first direction, the second baffle being circumferentially offset around and axially spaced along the fuel tank from the first baffle.

2. The tank of claim 1, wherein the base of the first baffle is curved to match a curved inner surface of the fuel tank.

3. The fuel tank of claim 1, wherein at least one of the first baffle or the second baffle is deformable to dampen movement of the fuel.

4. The fuel tank of claim 1, wherein at least one member of a baffle includes an opening to allow the fuel to pass through.

5. The fuel tank of claim 1, wherein a baffle is connected to the fuel tank by a torsion spring to allow the baffle to rotate in a rotational direction.

6. The fuel tank of claim 1, wherein a baffle is connected to the fuel tank by a torsion spring to allow the baffle to bend.

7. The fuel tank of claim 1, wherein a core of each baffle includes a magnetorheological material.

8. The fuel tank of claim 7, wherein the magnetorheological material includes at least one of foamed aluminum, carbon fiber composites, glass fiber composites, or steel foam.

9. The fuel tank of claim 1, wherein at least one of the first baffle or the second baffle has at least one of a uniform shape, a conical shape, a concave shape, a convex shape.

10. The fuel tank of claim 1, wherein the first baffle has a width to height ratio of 0.5 to 1.5.

11. The fuel tank of claim 1, wherein the height of the first baffle is constrained by a radius of the fuel tank, where the baffle height of the first baffle divided by the radius of the fuel tank is greater than zero and less than or equal to 0.5.

12. The fuel tank of claim 1, wherein the first baffle is made via additive manufacturing into a honeycomb shape.

13. The fuel tank of claim 1, wherein the first baffle and the second baffle are circumferentially offset by 45 degrees.

14. The fuel tank of claim 1, wherein the first baffle is axially aligned with the second baffle, a third baffle, and a fourth baffle, each baffle circumferentially spaced apart from a respective adjacent baffle by 90 degrees.

15. The fuel tank of claim 1, wherein the first baffle is axially aligned with the second baffle, a third baffle, a fourth baffle, a fifth baffle, and a sixth baffle, each baffle circumferentially spaced apart from a respective adjacent baffle by 60 degrees.

16. The fuel tank of claim 1, wherein the first and second baffles represent first and second sets of baffles with circumferential spacing, the first and second sets of baffles axially spaced to allow for five sets of baffles.

17. The fuel tank of claim 1, wherein the first direction is perpendicular to the second direction, the first member includes a row of holes and is impacted by a first amount of fuel, and the second member is impacted by a second amount of fuel, the first amount less than the second amount.

18. The fuel tank of claim 1, wherein the first member and the second member are orthogonal.

19. The fuel tank of claim 1, wherein the first member is at least one of straight, curved, sinusoidal, or cosine shaped.

20. The fuel tank of claim 17, wherein the fuel tank is a cryogenic fuel tank, and the first member is a uniform shape, and the second member is a convex shape relative to a direction of a flow of the fuel.

* * * * *